(12) United States Patent
    Kato et al.

(10) Patent No.: US 11,567,013 B2
(45) Date of Patent: Jan. 31, 2023

(54) IMAGE INSPECTION DEVICE AND LIGHTING DEVICE

(71) Applicant: OMRON Corporation, Kyoto (JP)

(72) Inventors: Yutaka Kato, Kyotanabe (JP); Shingo Inazumi, Amagasaki (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/248,810

(22) Filed: Jan. 16, 2019

(65) Prior Publication Data

US 2019/0242830 A1    Aug. 8, 2019

(30) Foreign Application Priority Data

Feb. 7, 2018  (JP) .............................. JP2018-019875
Nov. 29, 2018  (JP) .............................. JP2018-222992

(51) Int. Cl.
    *G01N 21/88*    (2006.01)
    *H04N 5/225*    (2006.01)
    (Continued)

(52) U.S. Cl.
    CPC ....... *G01N 21/8806* (2013.01); *G02B 3/0056* (2013.01); *G03B 15/02* (2013.01);
    (Continued)

(58) Field of Classification Search
    CPC ....... G01N 21/8806; G01N 2021/8816; G01N 2021/8835; G02B 3/0056; G03B 15/02; G03B 2215/0567; H04N 5/2256
    (Continued)

(56) References Cited

U.S. PATENT DOCUMENTS 6,022,124 A * 2/2000 Bourn ................ G01N 21/8806
                                                  362/231
2003/0058631 A1    3/2003 Yoneda
    (Continued)

FOREIGN PATENT DOCUMENTS

CN    101248348    8/2008
CN    102121580    7/2011
    (Continued)

OTHER PUBLICATIONS

"Search Report of Europe Counterpart Application", dated Jun. 17, 2019, p. 1-p. 7.
    (Continued)

*Primary Examiner* — Joseph G Ustaris
*Assistant Examiner* — Jimmy S Lee
(74) *Attorney, Agent, or Firm* — JCIPRNET

(57) ABSTRACT

An image inspection device and a lighting device capable of setting an irradiation solid angle for each location of a visual field and capable of miniaturization are provided. The image inspection device includes a photographing portion that photographs the target, and a light transmissible lighting portion that is disposed between the target and the photographing portion and configured to irradiate light in a direction toward the target. The lighting portion includes a plurality of light-emitting portions that is arranged in a matrix form and configured to be capable of selectively emitting light, and an optical system configured to control irradiation directions of the light emitted from each of the plurality of light-emitting portions to be directions corresponding to positions of each of the plurality of light-emitting portions.

18 Claims, 26 Drawing Sheets

(51) Int. Cl.
  *G02B 3/00* (2006.01)
  *G03B 15/02* (2021.01)
(52) U.S. Cl.
  CPC ... *H04N 5/2256* (2013.01); *G01N 2021/8816* (2013.01); *G01N 2021/8835* (2013.01); *G03B 2215/0567* (2013.01)
(58) Field of Classification Search
  USPC .......................................................... 348/131
  See application file for complete search history.

(56) References Cited

U.S. PATENT DOCUMENTS

| | | | |
|---|---|---|---|
| 2010/0033080 | A1 | 2/2010 | Yoneda |
| 2013/0169859 | A1* | 7/2013 | Kawakami ........... H04N 5/2256 348/369 |
| 2015/0253129 | A1* | 9/2015 | Ohnishi ............. G01B 11/2531 348/87 |
| 2016/0123892 | A1* | 5/2016 | Cauwenberghs .... H04N 5/2256 356/237.2 |
| 2016/0182891 | A1 | 6/2016 | Ko et al. |
| 2017/0315273 | A1* | 11/2017 | Tagawa .................. H04N 1/036 |
| 2017/0374244 | A1* | 12/2017 | Swaminathan ......... G06F 3/017 |
| 2017/0374355 | A1* | 12/2017 | Ko ....................... H04N 13/296 |
| 2018/0166616 | A1* | 6/2018 | White ..................... H01L 33/58 |
| 2018/0306404 | A1* | 10/2018 | Hanashima ............... F21V 5/02 |
| 2020/0056754 | A1* | 2/2020 | Di Trapani ............ F21V 3/049 |

FOREIGN PATENT DOCUMENTS

| | | |
|---|---|---|
| EP | 1930718 | 6/2008 |
| EP | 2341280 | 7/2011 |
| JP | 2003098093 | 4/2003 |
| JP | 2004502168 | 1/2004 |
| JP | 2010112735 | 5/2010 |
| JP | 2016014632 | 1/2016 |
| JP | 2017062120 | 3/2017 |
| WO | 9922224 | 5/1999 |
| WO | 2007026690 | 3/2007 |

OTHER PUBLICATIONS

Office Action of China Counterpart Application, with English translation thereof, dated Jul. 5, 2021, pp. 1-14.
Office Action of Japan Counterpart Application, with English translation thereof, dated Nov. 16, 2021, pp. 1-6.
"Office Action of China Counterpart Application" with English translation thereof, dated Jan. 6, 2022, p. 1-p. 14.

* cited by examiner

IMAGE INSPECTION DEVICE AND LIGHTING DEVICE

CROSS-REFERENCE TO RELATED APPLICATION

This application claims the priority benefit of Japanese application serial no. 2018-019875, filed on Feb. 7, 2018 and Japanese application serial no. 2018-222992, filed on Nov. 29, 2018. The entirety of the above-mentioned patent application is hereby incorporated by reference herein and made a part of this specification.

BACKGROUND

Technical Field

This technology relates to an image inspection device that uses photographic images to inspect a target and to a lighting device.

Related Art

In a field of FA (Factory Automation), it is known to photograph a target while lighting the target and use obtained photographic images to inspect the appearance of the target.

For example, in Japanese Laid-Open No. 2017-62120 (patent literature 1), an inspection system is disclosed which uses a lighting device including a surface light source and a lens, a light-shielding mask and a filter that are disposed between the surface light source and an inspection target. In this system, due to the lens, the light-shielding mask and the filter, irradiation solid angles of inspection light irradiated to each point of the inspection target are formed to be substantially uniform. Accordingly, the entire visual field can be irradiated uniformly and inspection accuracy of the target is improved.

In the aforementioned conventional lighting device, the lens disposed between the surface light source and the inspection target is required to have a size larger than the visual field of a photographing device in order to form a telecentric optical system. For this reason, the lighting device inevitably becomes large. In addition, the aforementioned lighting device cannot set irradiation solid angle for each location of the visual field.

SUMMARY

According to an example of this disclosure, an image inspection device that uses photographic images to inspect a target is provided. The image inspection device includes a photographing portion that photographs the target, and a light transmissible lighting portion that is disposed between the target and the photographing portion and configured to irradiate light in a direction toward the target. The lighting portion includes a plurality of light-emitting portions that is arranged in a matrix form and configured to be capable of selectively emitting light, and an optical system configured to control irradiation directions of the light emitted from each of the plurality of light-emitting portions to be directions corresponding to positions of each of the plurality of light-emitting portions.

DESCRIPTION OF THE EMBODIMENTS

Figure 1:
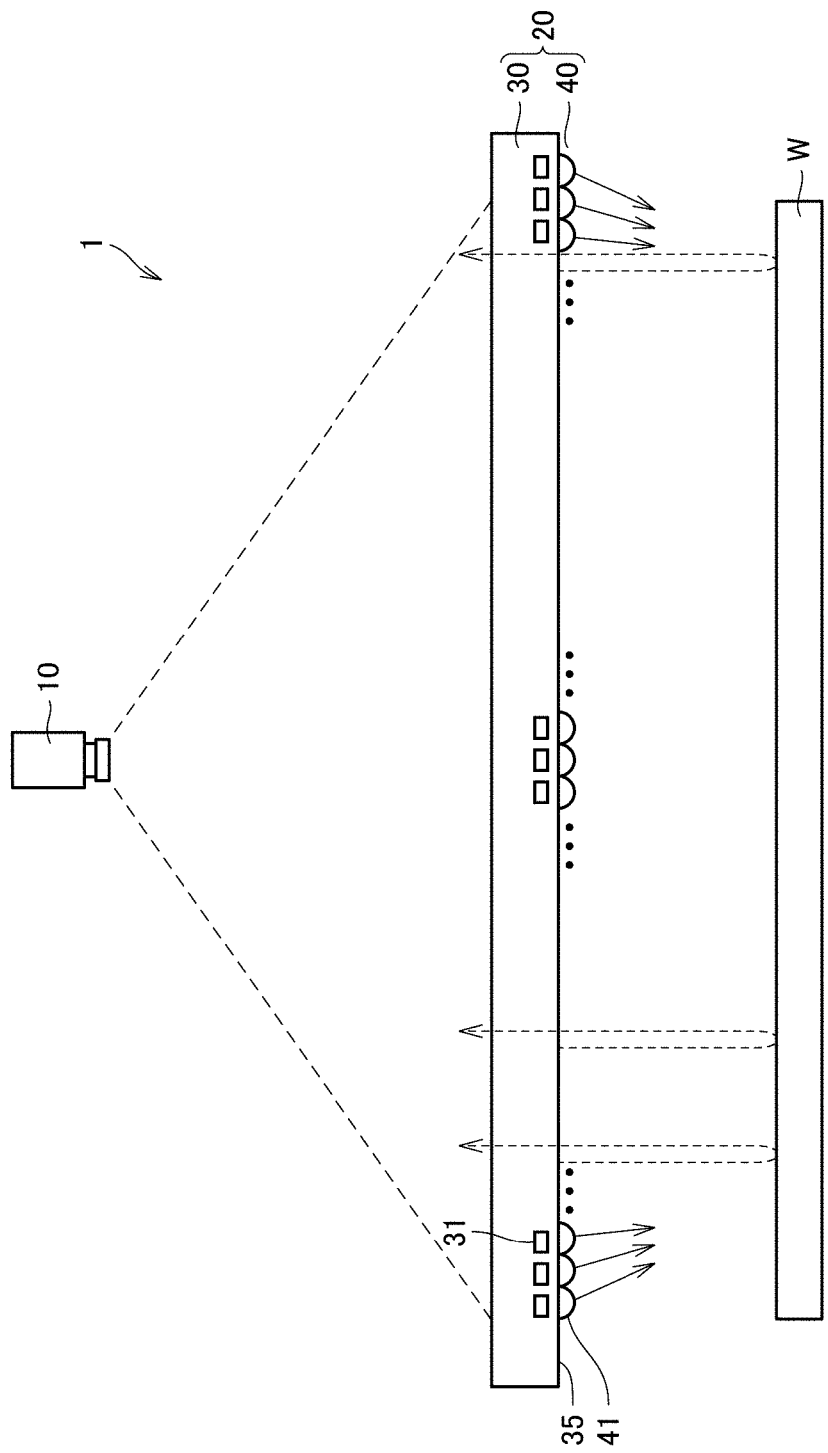
FIG. 1 is a schematic diagram showing a skeleton of an image inspection device of this embodiment.

The embodiments of the disclosure provide an image inspection device and a lighting device capable of setting an irradiation solid angle for each location of the visual field and capable of miniaturization.

According to an example of this disclosure, an image inspection device that uses photographic images to inspect a target is provided. The image inspection device includes a photographing portion that photographs the target, and a light transmissible lighting portion that is disposed between the target and the photographing portion and configured to irradiate light in a direction toward the target. The lighting portion includes a plurality of light-emitting portions that is arranged in a matrix form and configured to be capable of selectively emitting light, and an optical system configured to control irradiation directions of the light emitted from each of the plurality of light-emitting portions to be directions corresponding to positions of each of the plurality of light-emitting portions.

According to the embodiment of the disclosure, irradiation solid angles can be arbitrarily changed by selecting, from the plurality of light-emitting portions, the light-emitting portion required to emit light. The light-emitting portion required to emit light can be selected according to the location of the visual field. Therefore, the image inspection device capable of arbitrarily setting the irradiation solid angle for each location of the visual field can be achieved. Furthermore, because the irradiation solid angle can be arbitrarily changed, optical components such as slits or half mirrors are no longer required. Therefore, the lighting device can be miniaturized. As a result, the image inspection device capable of setting the irradiation solid angle for each location of the visual field and capable of miniaturization can be achieved.

In the aforementioned embodiment of the disclosure, the optical system includes a plurality of micro lenses disposed facing the plurality of light-emitting portions respectively.

According to the embodiment of the disclosure, the image inspection device capable of miniaturization can be achieved.

In the aforementioned embodiment of the disclosure, the plurality of micro lenses are disposed in a manner that optical axes of at least a portion of the micro lenses among the plurality of micro lenses deviate from optical axes of the light-emitting portions facing at least the portion of the micro lenses.

According to the embodiment of the disclosure, irradiation directions of the light can be controlled by a simple configuration.

In the aforementioned embodiment of the disclosure, the lighting portion is divided into a plurality of lighting elements, and in at least one lighting element among the plurality of lighting elements, at least the portion of the micro lenses is disposed with pitches smaller than pitches of the light-emitting portions.

According to the embodiment of the disclosure, the irradiation direction of the light can be controlled by a simple configuration.

In the aforementioned embodiment of the disclosure, at least a portion of the micro lenses is disposed disturbing regularity.

According to the embodiment of the disclosure, regarding the transmission property seen from the photographing portion, the possibility of occurrence of unintentional periodicity can be reduced.

In the aforementioned embodiment of the disclosure, the plurality of micro lenses are disposed in a manner that optical axes of at least a portion of micro lenses among the plurality of micro lenses are inclined with respect to optical axes of the light-emitting portions facing at least the portion of micro lenses.

According to the embodiment of the disclosure, irradiation directions of the light can be controlled by a simple configuration.

In the embodiment of the aforementioned disclosure, the lighting portion further includes a light-shielding portion configured to shield the light that is among the light emitted from the plurality of light-emitting portions and leaks from the surrounding of each of the plurality of micro lenses.

According to the embodiment of the disclosure, the possibility that the light from the light-emitting portions leaks to unintentional directions can be reduced.

In the aforementioned embodiment of the disclosure, the lighting portion further includes a light-shielding portion that is disposed between at least a portion of micro lenses among the plurality of micro lenses and the light-emitting portions facing at least the portion of micro lenses. The light-shielding portion has pinholes that are formed on locations which are deviated with respect to the optical axes of at least the portion of micro lenses.

According to the embodiment of the disclosure, proceeding directions of the lights passing through the pinholes can be controlled by the micro lenses. As a result, the image inspection device capable of setting an irradiation solid angle for each location in visual field and capable of miniaturization can be achieved.

In the aforementioned embodiment of the disclosure, the lighting portion further includes a light diffusion portion that diffuses the lights from the plurality of light-emitting portions.

According to the embodiment of the disclosure, uniform luminance of the light-emitting portions can be achieved.

According to an example of the disclosure, a lighting device is provided which includes the lighting portion included in the image inspection device provided in the aforementioned embodiment of the disclosure.

According to the embodiment of the disclosure, the lighting device capable of setting an irradiation solid angle for each location of the visual field and capable of miniaturization can be achieved.

According to the embodiment of the disclosure, the image inspection device and the lighting device capable of setting an irradiation solid angle for each location of the visual field and capable of miniaturization can be achieved.

Embodiments of the disclosure are described specifically with reference to the drawings. Moreover, the same or equivalent parts in the drawings are denoted by the same symbols and the description thereof is not repeated.

A. Application Example

First, an example of situations in which the disclosure is applied is described with reference to FIG. 1. FIG. 1 is a schematic diagram showing a skeleton of an image inspection device 1 of this embodiment.

The image inspection device 1 of this embodiment is applied to an apparatus that photographs a target (also referred to as "workpiece W" hereinafter) while lighting the target and uses obtained photographic images to conduct appearance inspection (inspection of scratches, stain, impurity and the like) of the workpiece W in a production line and the like of an industrial product. The image inspection device 1 performs inspection by detecting the light reflected by the workpiece W. For this reason, an object having a surface that reflects light can be used as the workpiece W.

As shown in FIG. 1, the image inspection device 1 includes a camera 10 which is an example of the photographing portion and a lighting device 20 which is an example of the lighting portion.

The camera 10 photographs a subject existing in a photographic visual field to generate image data which is a photographic image. The camera 10 photographs, through the lighting device 20, the workpiece W which acts as the subject and is the target of appearance inspection.

The lighting device 20 lights up the surface of the workpiece W every time the camera 10 photographs the workpiece W. The lighting device 20 is disposed between the workpiece W and the camera 10, irradiates light toward the workpiece W and is light transmissible. For this reason, the light emitted from the lighting device 20 is reflected on the workpiece W, passes through the lighting device 20 and reaches the camera 10. The lighting device 20 includes a surface light source 30 and a micro lens array 40 which is an example of the optical system.

The surface light source 30 emits light from a light emission surface 35 on the workpiece W side toward the workpiece W. The light is emitted from a plurality of light-emitting regions in the light emission surface 35 of the surface light source 30 and disposed in a matrix form. The reflected light from the workpiece W passes through a light transmission region in the surface light source 30 other than the light-emitting regions. Each light-emitting region includes a light-emitting portion 31. In an example, the light-emitting portion 31 includes a component formed by organic electroluminescence (referred to as "organic EL" hereinafter). A plurality of light-emitting portions 31 is formed to be capable of emitting light selectively. As an example, the surface light source 30 is a light source using organic EL. However, the lighting device 20 applicable to this embodiment is not limited to the light source using organic EL. Any lighting device which is light transmissible and having a plurality of light-emitting portions arranged in a matrix form and configured to be capable emitting light selectively can be applied to this embodiment.

The micro lens array 40 is disposed facing the light emission surface 35 of the surface light source 30. The micro lens array 40 includes a plurality of lenses 41 arranged facing the plurality of light-emitting portions 31 respectively. In an example, the lenses 41 are convex lenses. The lenses 41 are configured to guide the light emitted from the corresponding light-emitting portions 31 to desired directions. That is, the micro lens array 40 is configured to control the irradiation directions of the light emitted from each of the plurality of light-emitting portions 31 to be directions corresponding to positions of each light-emitting portion 31.

Irradiation solid angles can be arbitrarily changed by selecting, from the plurality of light-emitting portions 31, the light-emitting portion required to emit light. The light-emitting portion required to emit light is selected according to the location of the visual field. Therefore, the image inspection device 1 capable of arbitrarily setting the irradiation solid angle for each location of the visual field can be achieved. Furthermore, because the irradiation solid angle can be arbitrarily changed, optical components such as slits or half mirrors are no longer required. Therefore, the lighting device 20 can be miniaturized.

Accordingly, the image inspection device 1 capable of setting the irradiation solid angle for each location of the visual field and capable of miniaturization can be achieved.

Figure 2:
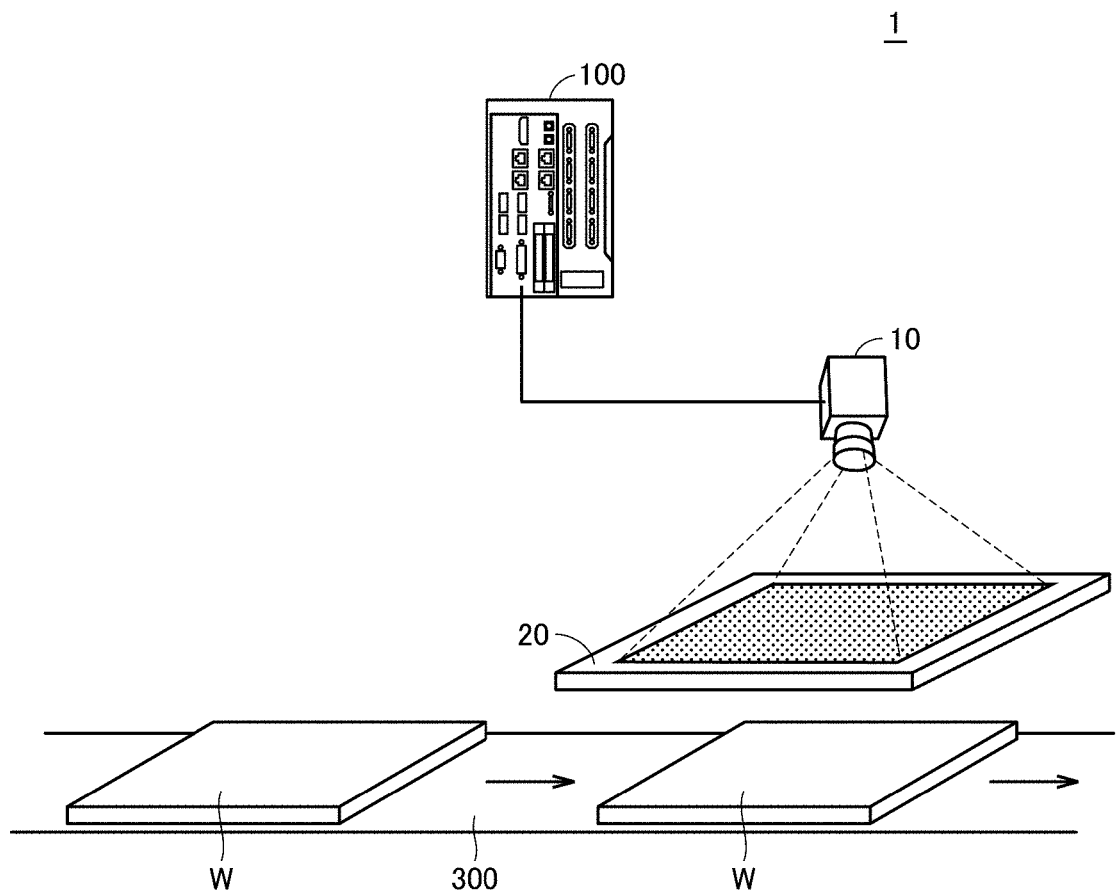
FIG. 2 is a schematic diagram showing an example of a production line in which the image inspection device of this embodiment is applied.

B. An Example of Production Line to which Image Inspection Device is Applied Next, an example of the production line to which the image inspection device 1 is applied is described with reference to FIG. 2. FIG. 2 is a schematic diagram showing an example of the production line to which the image inspection device 1 of this embodiment is applied.

As shown in FIG. 2, the image inspection device 1 of this embodiment includes the camera 10 that photographs the workpieces W carried in continuously, the lighting device 20 that lights up the workpieces W, and a control device 100 that controls the lighting device 20 and the camera 10. The camera 10 includes, as constitutional elements, an optical system such as lenses or diaphragms, and light receiving elements such as a CCD (Charge Coupled Device) image sensor or a CMOS (Complementary Metal Oxide Semiconductor) image sensor. The image inspection device 1 is a device that photographs the workpieces W by the camera 10 while lighting the workpieces W by the lighting device 20 and uses the obtained photographic images to perform the appearance inspection of the workpiece W, which is done in the production line and the like of an industrial product under the control of the control device 100.

Specifically, the workpiece W that becomes the inspection target is moved by a movable stage 300 to an inspection position where the camera 10 and the lighting device 20 are fixed. When moved to the inspection position, the workpiece W does not move until the appearance inspection by the image inspection device 1 is done. At this time, the control device 100 photographs the workpiece W by the camera 10 while lighting the workpiece W by the lighting device 20, and displays the photographic images on a monitor. In this way, an operator observes colors of the photographic images displayed on the monitor screen and inspects appearance of the workpiece W. Elsewise, the control device 100 may perform a predetermined image treatment on the photographic images and perform abnormality determination of the workpiece W based on result of the image treatment.

The control device 100 includes, for example, a processor such as a CPU (Central Processing Unit) or a MPU (Micro-Processing Unit), a RAM (Random Access Memory), a display controller, a system controller, an I/O (Input Output) controller, a hard disk, a camera interface, an input interface, a light-emitting interface, a communication interface, and a memory card interface. These portions are connected to be capable of data communication with each other using the system controller as a center.

C. An Example of Configuration of Lighting Device

Figure 3:
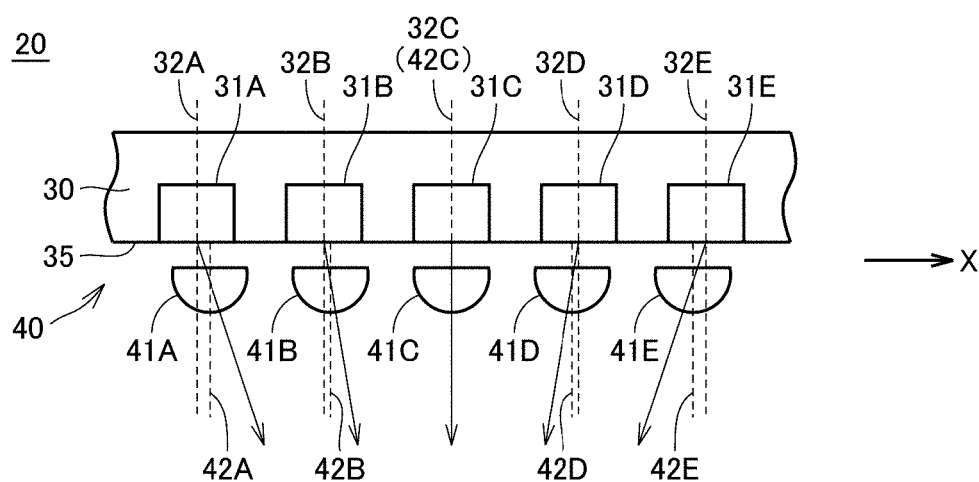
FIG. 3 is a schematic diagram showing a portion of a cross section of an example of a lighting device according to this embodiment.
Figure 4:
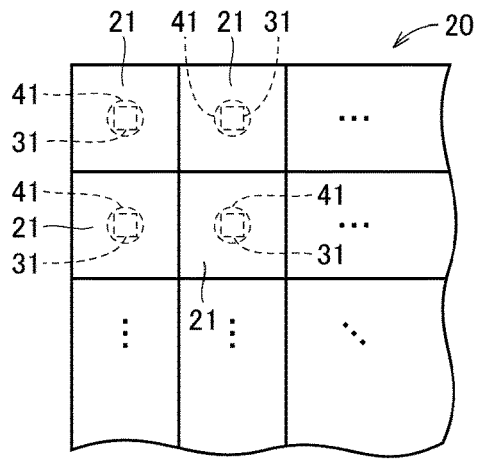
FIG. 4 is a schematic plan view obtained by enlarging a portion of the lighting device of this embodiment.

An example of configuration of the lighting device of this embodiment is described with reference to FIG. 3 and FIG. 4. FIG. 3 is a schematic diagram showing a portion of a cross section of an example of the lighting device according to this embodiment. FIG. 4 is a schematic plan view obtained by enlarging a portion of the lighting device of this embodiment.

The lighting device 20 is a transmission type sheet lighting device and includes the surface light source 30 and the micro lens array 40. The surface light source 30 includes a plurality of light-emitting portions arranged in a matrix form along the light emission surface 35. The light-emitting portions 31A-31E are representatively displayed in FIG. 3.

Each of the light-emitting portions 31A-31E has a pair of electrodes (not shown) facing each other. By applying a voltage between the pair of electrodes, the light-emitting portions emit light. By selecting the electrode pair to which the voltage is to be applied from a plurality of electrode pairs, the light-emitting portions required to emit light can be selected. Colors of the light emitted by each of the light-emitting portions 31A-31E are not limited. For example, the plurality of light-emitting portions 31 may emit light of the same color. Elsewise, the light-emitting portions capable of varying colors of the light can be achieved by combining light-emitting portions emitting red light, light-emitting portions emitting green light and light-emitting portions emitting blue light.

The micro lens array 40 includes a plurality of lenses 41 which is a plurality of micro lenses disposed facing the plurality of light-emitting portions 31 respectively. The plurality of lenses 41 is disposed in a matrix form along the light emission surface 35. The lenses 41A-41E facing the light-emitting portions 31A-31E respectively are representatively displayed in FIG. 3. In an example, each of the lenses 41A-41E is a plano-convex lens. A plane surface of the plano-convex lens is directed toward the light emission surface 35. For example, the plano-convex lens may be a hemispheric lens.

Each lens is used to control the irradiation direction of the light emitted from the corresponding light-emitting portion. In one embodiment, between the lenses 41A-41E, relative positions of optical axes of the lenses to optical axes of the light-emitting portions are different. Directions of the light emitted from the lenses are determined according to direction and deviation amount of the deviation of the optical axes of the lenses to the optical axes of the light-emitting portions. Moreover, in this embodiment, the optical axis of the light-emitting portion means an axis passing through a center of the light-emitting region and perpendicular to the light-emitting region, and the optical axis of the lens means an axis passing through a center of the lens and perpendicular to a main surface of the lens.

An optical axis 32C of the light-emitting portion 31C substantially corresponds to an optical axis 42C of the lens 41C. An optical axis 42A of the lens 41A deviates from an optical axis 32A of the light-emitting portion 31A toward a right direction in the paper surface (+X direction). Similarly, an optical axis 42B of the lens 41B also deviates from an optical axis 32B of the light-emitting portion 31B toward the +X direction. Regarding the pair of the light-emitting portion 31A and lens 41A, the magnitude of the deviation (also referred to as "deviation amount" hereinafter) of the optical axis of the lens to the optical axis of the light-emitting portion is greater than the deviation amount of the pair of the light-emitting portion 31B and the lens 41B.

On the other hand, an optical axis 42D of the lens 41D deviates from an optical axis 32D of the light-emitting portion 31D toward a left direction in the paper surface (−X direction). Similarly, an optical axis 42E of the lens 41E also deviates from an optical axis 32E of the light-emitting portion 31E toward the −X direction. The deviation amount of the pair of the light-emitting portion 31E and the lens 41E is greater than the pair of the light-emitting portion 31D and the lens 41D.

As understood from FIG. 3, by selectively making any one of the light-emitting portion 31A to the light-emitting portion 31E shown in FIG. 3 emit light, the irradiation solid angle can be varied. Because the irradiation solid angle can be varied, limitation on the lighting pattern of the lighting device 20 decreases. In other words, the lighting in accordance with any pattern can be achieved by the lighting device 20.

As shown in FIG. 4, the lighting device 20 includes a plurality of lighting elements 21 disposed in a matrix form. That is, the lighting device 20 is divided into the plurality of lighting elements 21. Each of the lighting elements 21 includes a plurality of light-emitting portions 31 and a plurality of lenses 41. For example, each of the lighting elements 21 can includes the light-emitting portion 31A to the light-emitting portion 31E and the lens 41A-41E shown in FIG. 3. For the convenience of illustration, in FIG. 4, one light-emitting portion 31 and one corresponding lens 41 included in each of the lighting elements 21 are shown.

Each of the lighting elements 21 includes a light-emitting region and a transparent region. By making the light-emitting region emit light, the entire lighting elements 21 can be made to emit light. On the other hand, each lighting element 21 is light transmissible by having the transparent region.

The lighting device 20 can light the plurality of lighting elements 21 in a mutually independent way. The light irradiation pattern of the lighting device 20 is determined by the lighting element 21 among the plurality of the lighting elements 21 and including the light-emitting portion 31 required to emit light (that is, the lighting element 21 to be lighted up). In the lighting device 20 capable of changing a wavelength of the light irradiated from each lighting element 21, the irradiation pattern may be determined by the lighting element 21 to be lighted up among the plurality of lighting elements 21 and the wavelength of the light irradiated from each lighting element 21 to be lighted up.

Figure 5:
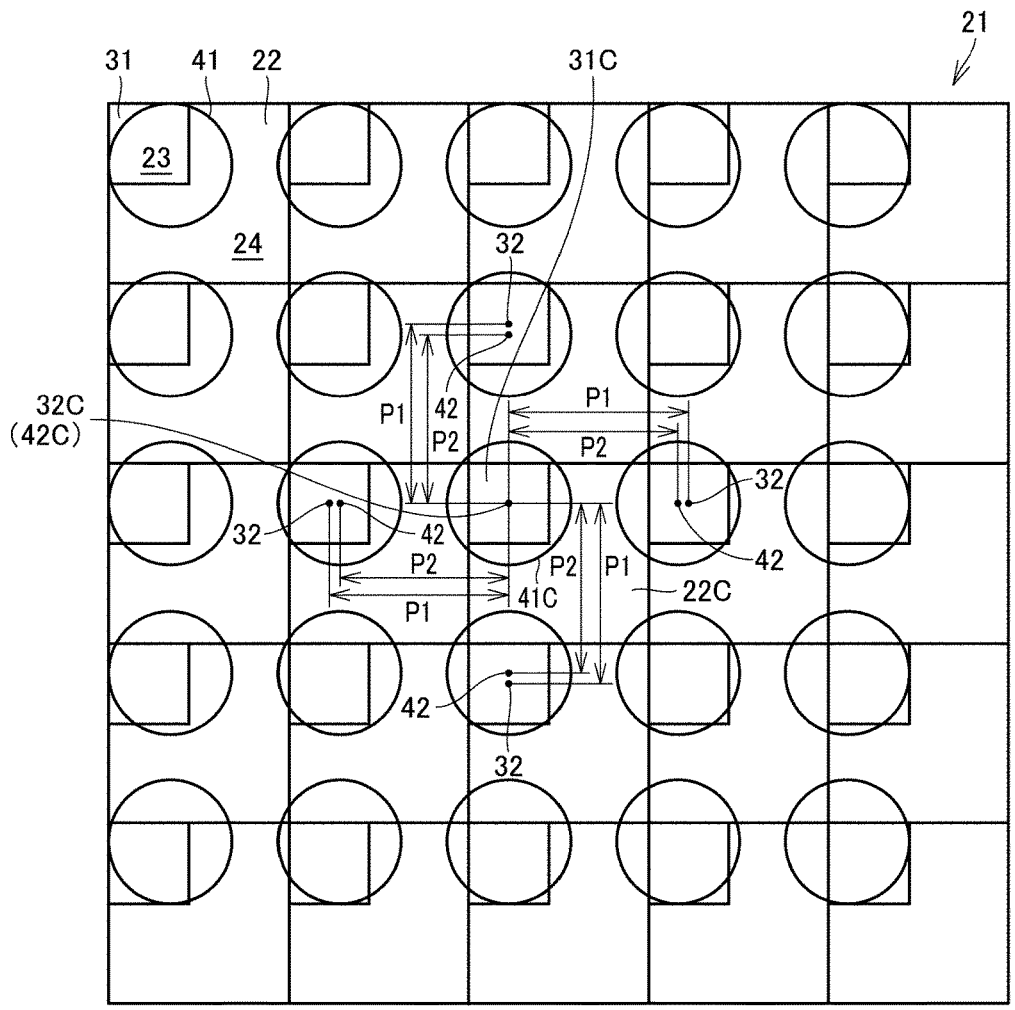
FIG. 5 is a plan view schematically showing an example of structures of a lighting element which is a constitutional element of the lighting device.

FIG. 5 is a plan view schematically showing an example of structures of the lighting element which is a constitutional element of the lighting device 20. In FIG. 5, the plan view of the lighting element from the photographing portion side (an upper side of the lighting device 20) is shown.

The lighting element 21 includes a plurality of cells 22 disposed in a matrix form. In the description below, "row" means the X direction and "column" means the Y direction. In FIG. 5, the lighting element 21 consisting of 25 cells 22 disposed into five rows and five columns (=5×5) is shown. However, the number of the cells 22 forming the lighting element 21 is not particularly limited. For example, the lighting element 21 may be formed by 121 cells 22 disposed into 11 rows and 11 columns (=11×11). With a greater number of the cells 22, resolution of the lighting element 21 in the irradiation direction can be improved, but the resolution in a light-emitting position decreases. The number of the cells 22 forming the lighting element 21 can be determined from the resolution in the irradiation direction and the resolution in the light-emitting position.

Each of the cells 22 includes a light-emitting portion 31, a lens 41, and a transparent region 24. A light-emitting surface of the light-emitting portion 31 forms the light-emitting region in the cell 22.

The plurality of light-emitting portions 31 is disposed with a first pitch P1 in the X direction and the Y direction. The plurality of lenses 41 is disposed with a second pitch P2 in the X direction and the Y direction. Because the second pitch P2 is smaller than the first pitch P1 (P2<P1), for the plurality of cells 22 arranged along the X direction (a row direction), the deviation amount in the X direction between the optical axis 32 of the light-emitting portion 31 and the optical axis 42 of the lens 41 corresponds to an arithmetical progression having a common difference of (P1−P2). Similarly, for the plurality of cells 22 arranged along the Y direction (a column direction), the deviation amount in the Y direction between the optical axis 32 of the light-emitting portion 31 and the optical axis 42 of the lens 41 corresponds to the arithmetical progression having the common difference of (P1−P2).

In FIG. 5, the cell 22C is a cell positioned in the center of the lighting element 21. The cell 22C includes the light-emitting portion 31C and the lens 41C. In a plan view, the optical axis 32C of the light-emitting portion 31C overlaps with the optical axis 42C of the lens 41C. That is, both the deviation amount in the X direction and the deviation amount in the Y direction between the optical axis 32C and the optical axis 42C are 0.

In each cell inside the lighting elements 21, the deviation amount in the X direction and the deviation amount in the Y direction between the optical axis 32 of the light-emitting portion 31 and the optical axis 42 of the lens 41 are determined according to a distance in the X direction and a distance in the Y direction between the cell and the cell 22C in the center. Accordingly, the light irradiation direction can be varied for each cell 22. The lighting elements 21 can irradiate light to the workpiece from a plurality of directions. Furthermore, by selecting the cells to be lighted up among the plurality of cells, the irradiation directions of the light from the lighting elements 21 can be controlled.

In the structure shown in FIG. 5, the pitches between the light-emitting portions 31 and the pitches between the lenses 41 are the same in the X direction and the Y direction. However, the pitches between the light-emitting portions 31 can also be varied in the X direction and the Y direction. Similarly, the pitches between the lenses 41 can also be varied in the X direction and the Y direction.

According to the configuration shown in FIG. 5, the design of the lighting elements 21 can be simplified. However, regarding the transmission property seen from the photographing portion (the camera 10), there is a possibility of occurrence of unintentional periodicity. In order to reduce such a possibility, the structure shown in FIG. 5 may be changed.

Figure 6:
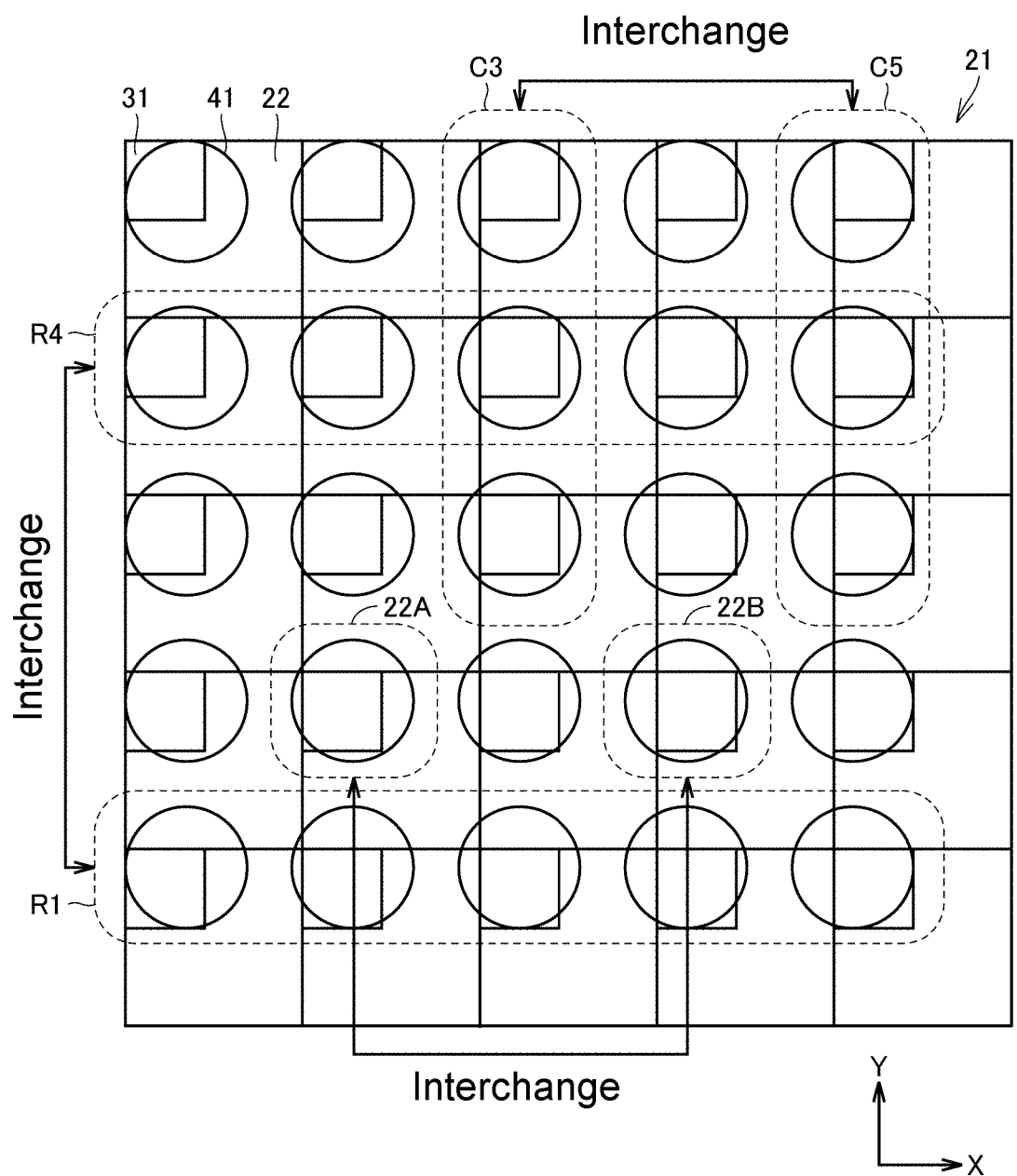
FIG. 6 is a schematic plan view describing an example of a method to change the structure shown in FIG. 5.

FIG. 6 is a schematic plan view describing an example of a method to change the structure shown in FIG. 5. As shown in FIG. 6, in the lighting elements 21 shown in FIG. 5, certain parts are interchanged with other parts. For example, a plurality of cells belonging to a certain row may be interchanged with a plurality of cells belonging to another row. Or a plurality of cells belonging to a certain column may be interchanged with a plurality of cells belonging to another column. Or one cell may be interchanged with another cell. An entire row may be interchanged with the entire of another row, or a portion of a row may be interchanged with a portion of another row. Similarly, an entire column may be interchanged with the entire of another column, or a portion of a column may be interchanged with a portion of another column. In FIG. 6, an example of interchanging a row R1 with a row R4, an example of interchanging a portion of a column C3 with a portion of a column C5, and an example interchanging a cell 22A with a cell 22B are shown.

Figure 7:
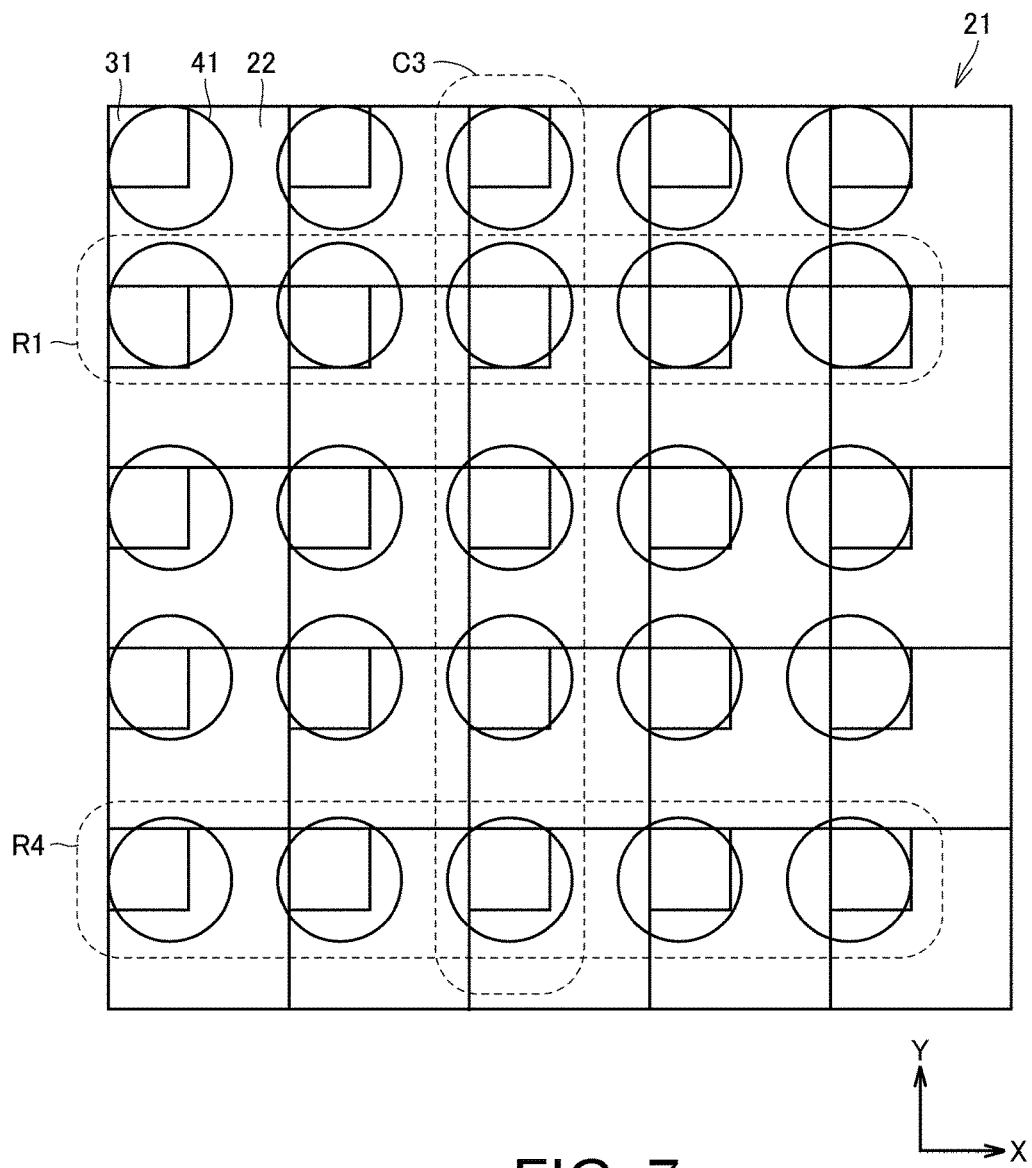
FIG. 7 is a plan view schematically showing a variation of the lighting element structure which is formed by the method shown in FIG. 6.

FIG. 7 is a plan view schematically showing a variation of the structure of the lighting element which is formed according to the method shown in FIG. 6. The structure shown in FIG. 7 is equivalent to the structure shown in FIG. 6 in which the row R1 is interchanged with the row R4. Among the five cells 22 contained in each column (for example, the column C3), the change of deviation amount in the Y direction between the optical axes 32 of the light-emitting portions 31 and the optical axes 42 of the lenses 41 does not corresponds to the arithmetical progression with the common difference (P1−P2). In this way, a plurality of cells 22 can be disposed in accordance with a pattern which disturbs the regularity tenable in the structure of FIG. 5. Accordingly, regarding the transmission property seen from the photographing portion (the camera 10), the possibility of occurrence of unintentional periodicity can be reduced.

Moreover, the interchanging pattern illustrated in FIG. 6 is not bound to be uniform in all the lighting elements 21. The interchanging pattern in the lighting element 21 positioned in a certain location may be different from the interchanging pattern in the adjoining lighting element 21.

Figure 8:
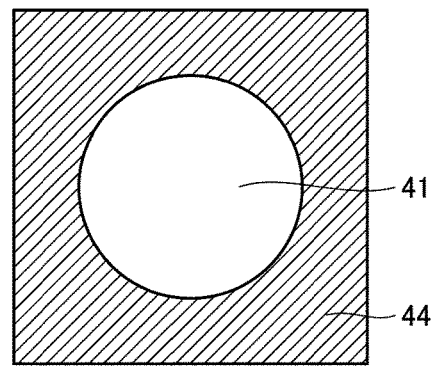
FIG. 8 is a schematic plan view showing a configuration dealing with light that leaks from the surrounding of lenses.
Figure 9:
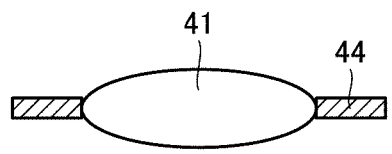
FIG. 9 is a schematic cross-sectional view of the configuration shown in FIG. 8.

When the deviation amount (displacement amount) of the optical axis 42 of the lens 41 with respect to the optical axis 32 of the light-emitting portion 31 is great, there is a possibility that a portion of the light emitted from the light-emitting portion 31 leaks from the surrounding of the lens 41. FIG. 8 is a schematic plan view showing a configuration dealing with light that leaks from the surrounding of the lens 41. FIG. 9 is a schematic cross-sectional view of the configuration shown in FIG. 8. As shown in FIG. 8 and FIG. 9, the light-shielding portion 44 may be arranged so as to surround a periphery of the lens 41. The light-shielding portion 44 consists of a member impenetrable to light or a member attenuating light. The possibility of the light from the light-emitting portion 31 leaking to unintentional directions can be reduced by the light-shielding portion 44.

Figure 10:
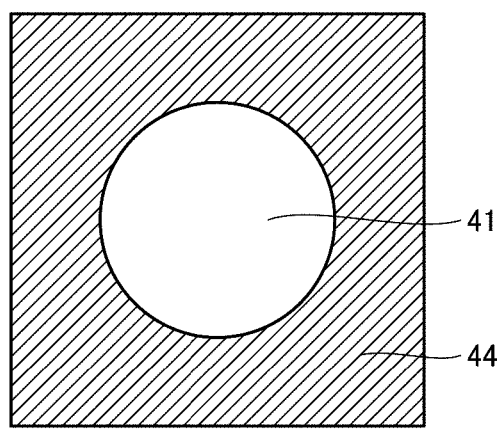
FIG. 10 is a schematic plan view showing a variation of the configuration shown in FIG. 8.

FIG. 10 is a schematic plan view showing a variation of the configuration shown in FIG. 8. In the example shown in FIG. 10, an area of the light-shielding portion 44 is larger than the configuration shown in FIG. 8. Accordingly, the possibility of the light from the light-emitting portion 31 leaking to unintentional directions can be further reduced.

Figure 11:
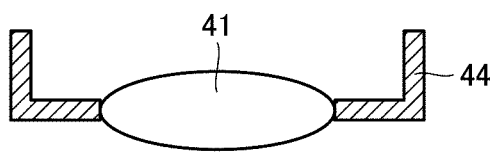
FIG. 11 is a schematic cross-sectional view showing another variation of the configuration shown in FIG. 8.

FIG. 11 is a schematic cross-sectional view showing another variation of the configuration shown in FIG. 8. In the example shown in FIG. 11, the light-shielding portion 44 has a configuration that surrounds the lens 41 by a sufficient height along the height (thickness) direction of the lens 41 in addition to the configuration shown in FIG. 10. According to the configuration shown in FIG. 10, the effect of reducing the light leaking from the surrounding of the lens 41 can be further improved.

D. An Example of Pattern Lighting

Figure 12:
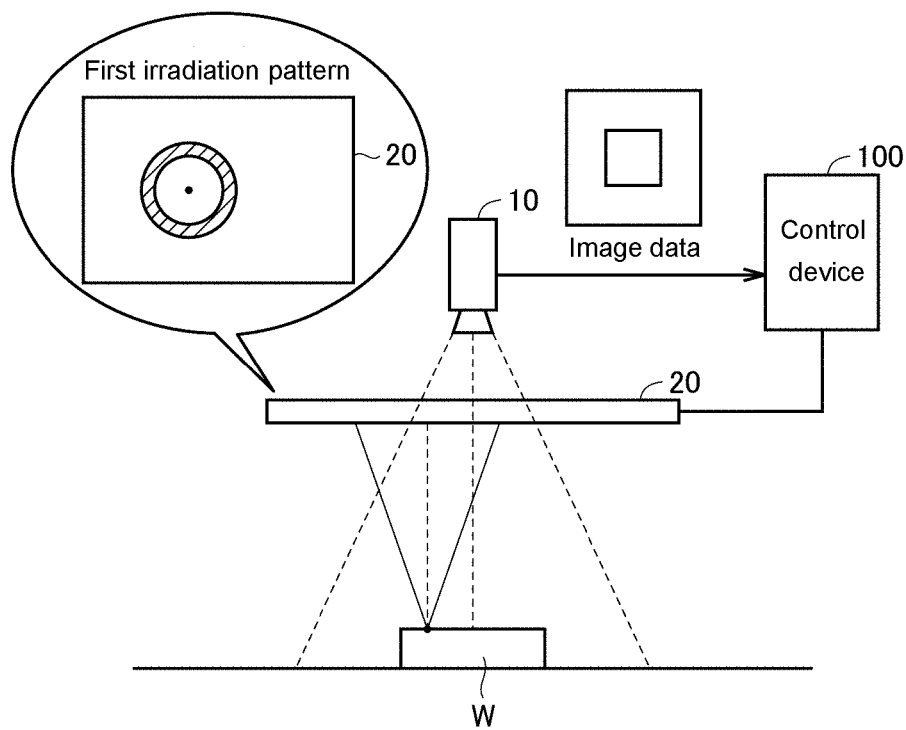
FIG. 12 is a diagram schematically showing one application example of pattern lighting using the image inspection device of this embodiment.
Figure 12:
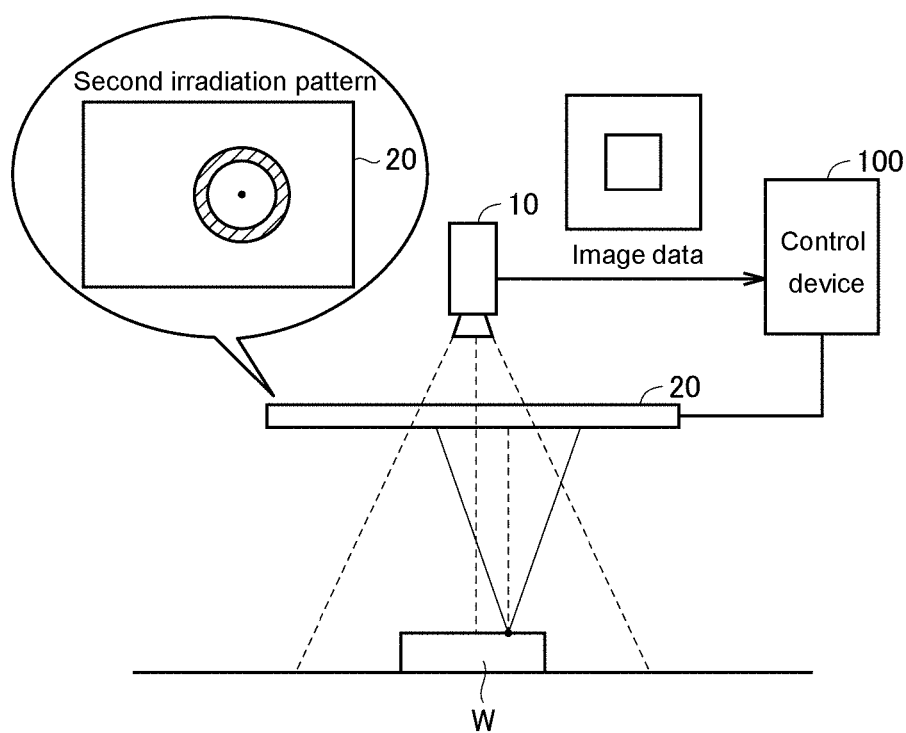

FIG. 12 is a diagram schematically showing one application example of pattern lighting using the image inspection device of this embodiment. As shown in FIG. 12, the control device 100 causes light of a certain irradiation pattern to irradiate on the workpiece W from the lighting device 20, and causes the camera 10 to photograph the workpiece W to obtain image data in the state that this irradiation pattern is irradiated. In FIG. 12, a first irradiation pattern and a second irradiation pattern both of which are ring-shaped pattern are illustrated. Such a pattern can be achieved, for example, by lighting the light-emitting portions 31A, 31E in the configuration shown in FIG. 3.

According to this embodiment, for a workpiece (mirror, glass, resin, metal and so on) consisting of composite material for example, the optimal principle can be applied to each part of the workpiece to perform measurement and inspection.

Figure 13:
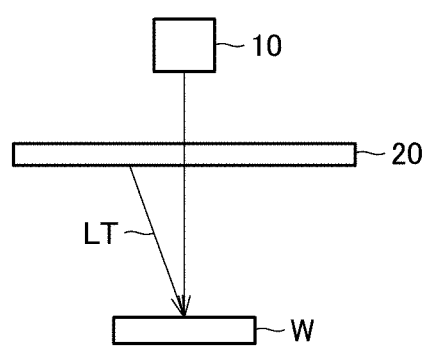
FIG. 13 is a diagram describing the pattern lighting when an optical cutting method is performed.
Figure 14:
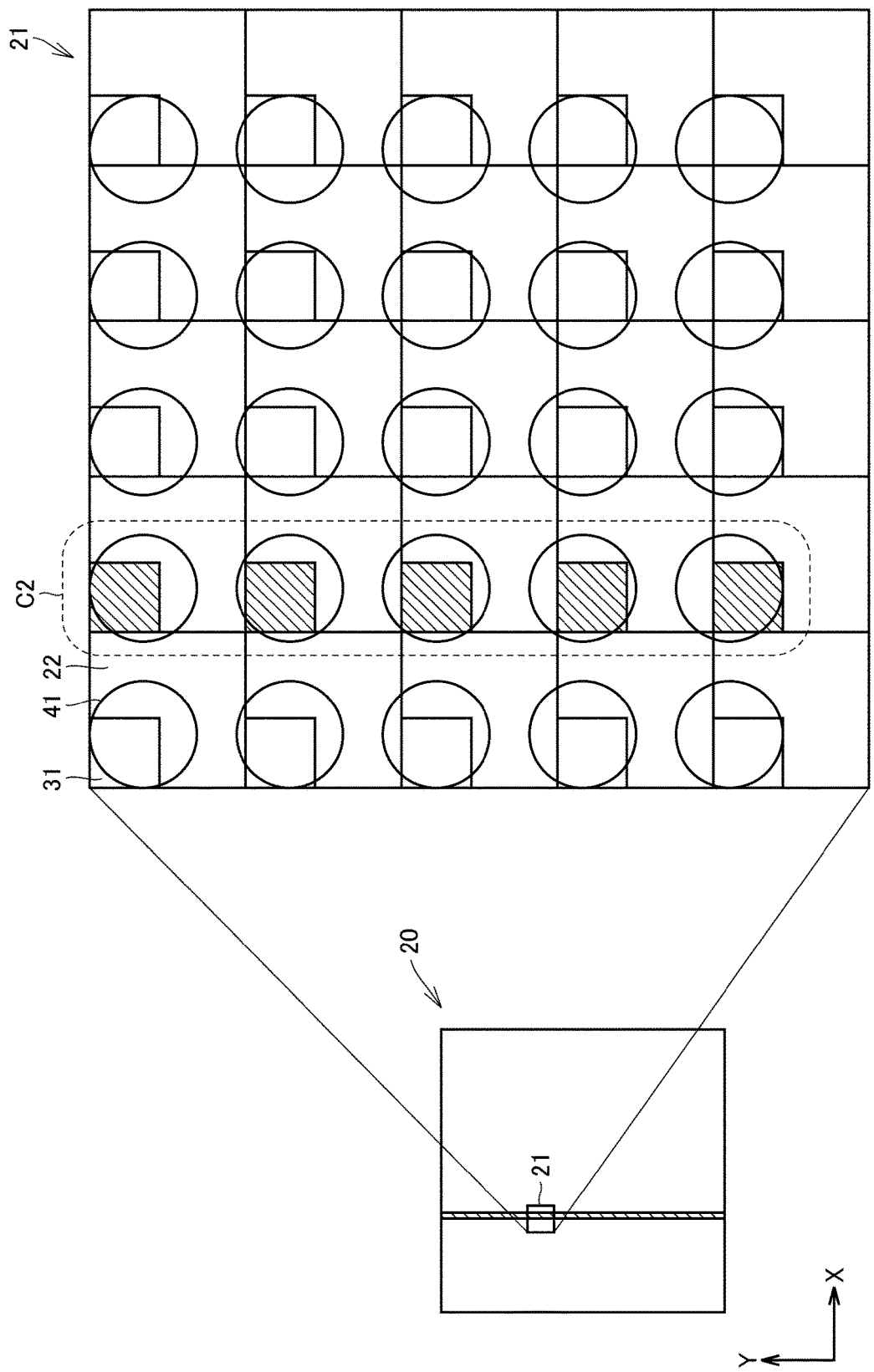
FIG. 14 is a diagram used to describe the lighting pattern of the lighting device used for optical cutting method.

FIG. 13 is a diagram describing the pattern lighting when an optical cutting method is performed. FIG. 14 is a diagram used to describe the lighting pattern of the lighting device used for optical cutting method. The optical cutting method is applied, for example, to a case that the part of the workpiece which is a measurement target consists of resin or metal. As shown in FIG. 13 and FIG. 14, the lighting device 20 irradiates a light LT of a line-shaped irradiation pattern on the workpiece W from a predetermined direction, and the camera 10 photographs the surface of the workpiece W. Height information can be obtained by applying triangulation to the image.

The configurations of the lighting elements 21 shown in FIG. 14 and the drawings described below are basically the same as the configuration shown in FIG. 5, and thus detailed description is not repeated. Moreover, in the drawings described below, the lighting regions in the lighting device 20 and the lighting light-emitting portions in the lighting elements are denoted by hatchings.

As shown in FIG. 14, the lighting device 20 lights up a plurality of lighting elements 21 arranged along the Y direction. In each lighting element 21, the light-emitting portions 31 disposed in a specific column (for example, a column C2) emit light. Accordingly, the lighting device 20 can irradiate line-shaped light along the Y direction to a desired location on the surface of the workpiece W from a desired direction. In the aforementioned description, the Y direction may be replaced with the X direction. In this case, the lighting device 20 can irradiate line-shaped light along the X direction to a desired location on the surface of the workpiece W.

Figure 15:
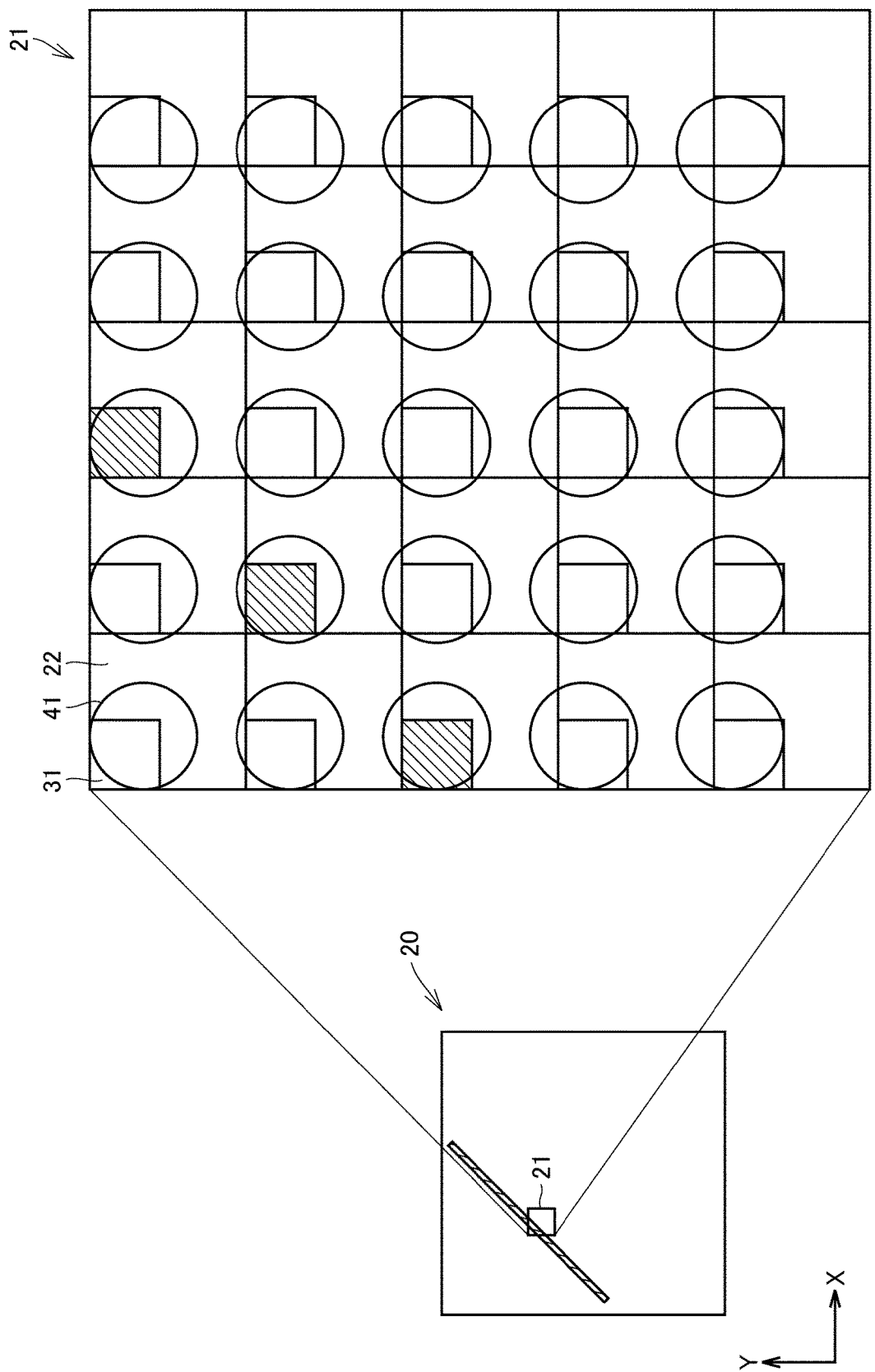
FIG. 15 is a diagram used to describe a variation of the lighting pattern shown in FIG. 14.

FIG. 15 is a diagram used to describe a variation of the lighting pattern shown in FIG. 14. As shown in FIG. 15, the lighting device 20 lights up a plurality of lighting elements 21 arranged along a direction 45° from the X direction and the Y direction for example. In each lighting element 21, a plurality of light-emitting portions 31 arranged along the direction 45° from the X direction and the Y direction emit light. Accordingly, the line-shaped light inclined 45° with respect to the X direction and the Y direction can be irradiated to the workpiece W.

Moreover, the light of a plurality of irradiation patterns in which the position on the workpiece surface irradiated by the light and the irradiation direction of the light are combined may be irradiated to the workpiece W. Accordingly, because dead angles can be reduced in the photographing of the camera 10, the robustness of the inspection can be improved. That is, the accuracy of the inspection can be improved.

Figure 16:
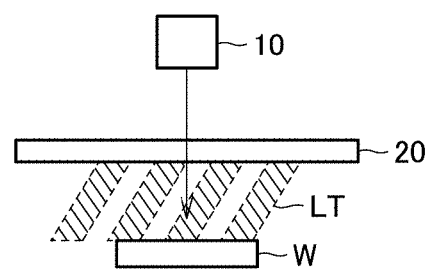
FIG. 16 is a diagram used to describe the pattern lighting when a phase shift method is performed on a diffusion reflection surface.
Figure 17:
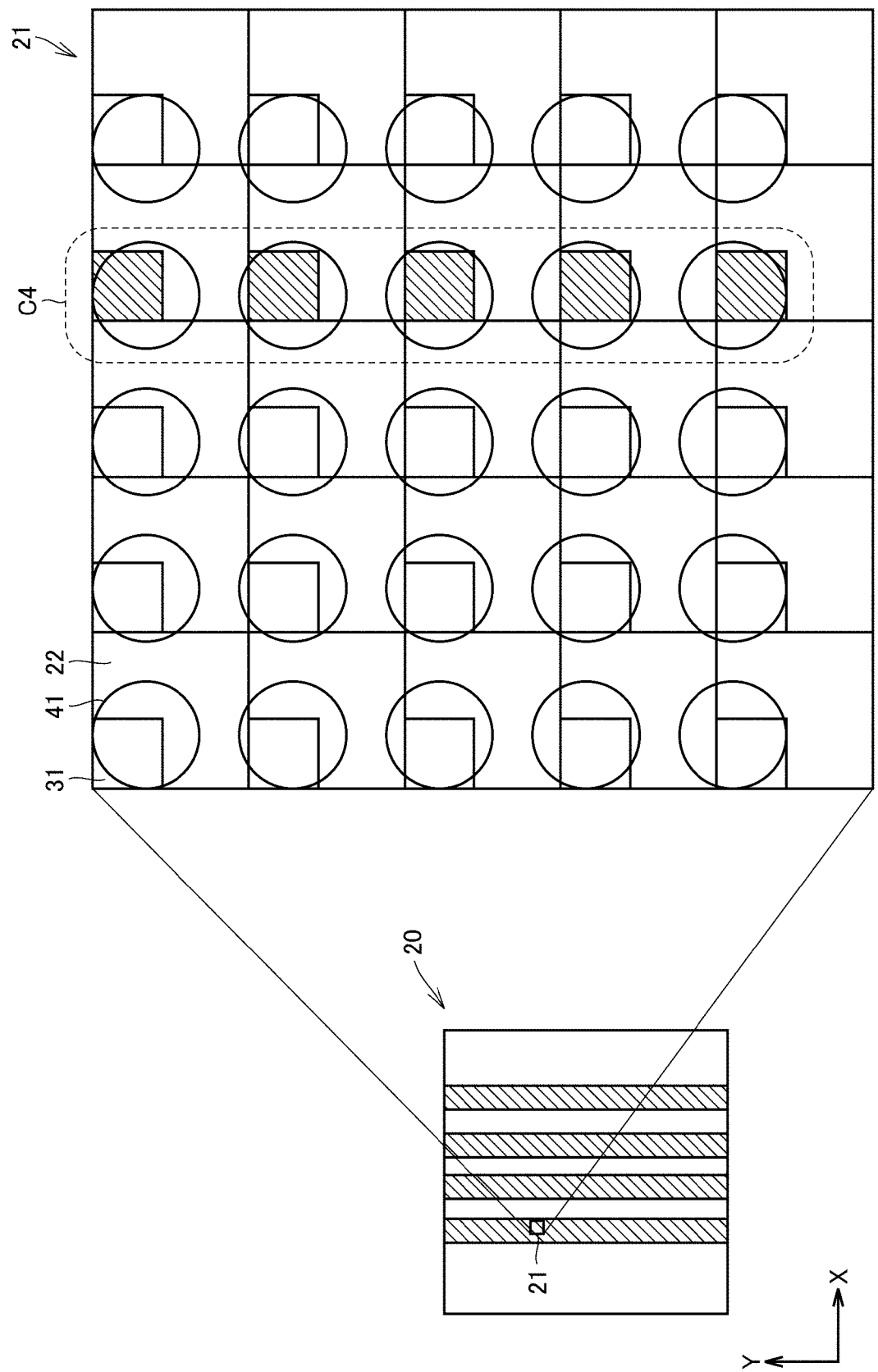
FIG. 17 is a diagram used to describe an example of the lighting pattern of the lighting device used for the phase shift method (diffusion reflection) shown in FIG. 16.

FIG. 16 is a diagram used to describe the pattern lighting when a phase shift method is performed on a diffusion reflection surface. FIG. 17 is a diagram used to describe an example of the lighting pattern of the lighting device used for the phase shift method (diffusion reflection) shown in FIG. 16. The phase shift method is applied, for example, to a case that the part of the workpiece which is a measurement target consists of resin or metal. As shown in FIG. 16, the lighting device 20 irradiates a light LT of a stripe-shaped irradiation pattern from a predetermined direction, and the camera 10 photographs the surface of the workpiece W. The lighting device 20 lights up and puts off relevant lighting elements when irradiating the light so as to change a phase of the stripe-shaped pattern.

As shown in FIG. 17, the lighting device 20 lights up a plurality of columns of lighting elements 21 so that light and dark alternate along the X direction. In each lighting element 21, a plurality of light-emitting portions 31 disposed in a specific column (a column C4 in the example in FIG. 17) emit light. Accordingly, the lighting device 20 can emit light of a linear irradiation pattern along the Y direction.

Figure 18:
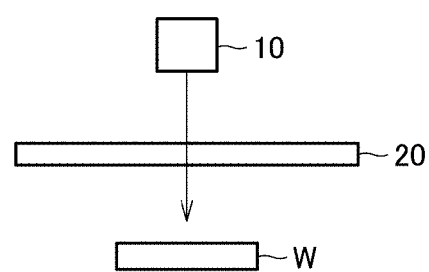
FIG. 18 is a diagram used to describe another example of the pattern lighting when the phase shift method is performed on the diffusion reflection surface.
Figure 19:
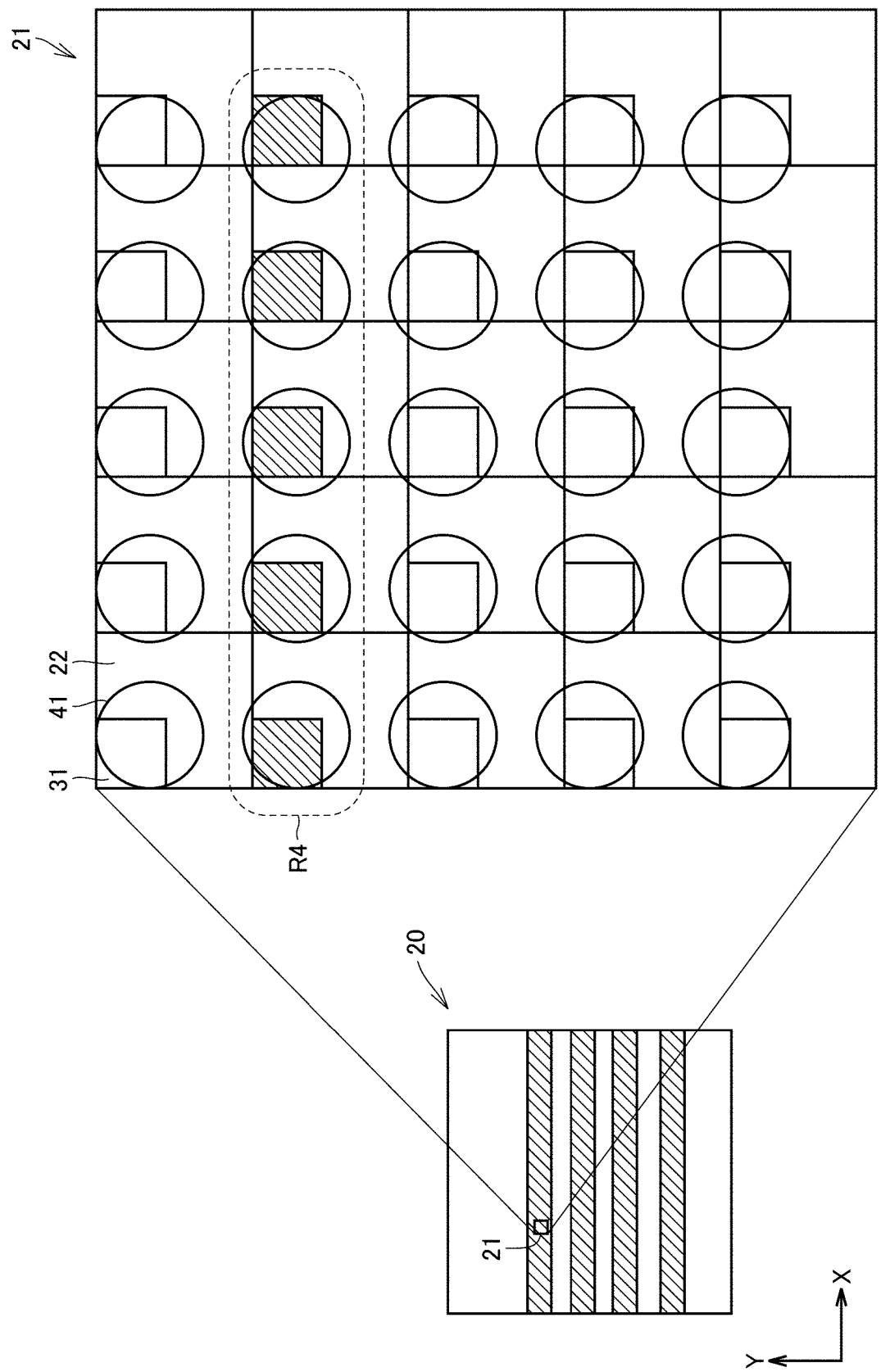
FIG. 19 is a diagram used to describe another example of the lighting pattern of the lighting device used for the phase shift method (diffusion reflection) shown in FIG. 18.

FIG. 18 is a diagram used to describe another example of the pattern lighting when the phase shift method is performed on the diffusion reflection surface. FIG. 19 is a diagram used to describe another example of the lighting pattern of the lighting device used for the phase shift method (diffusion reflection) shown in FIG. 18. In the examples shown in FIG. 18 and FIG. 19, the irradiation pattern shown in FIG. 16 and FIG. 17 is rotated for 90°. Therefore, as shown in FIG. 19, the light-emitting portions 31 disposed in a specific row (a row R4 in the example in FIG. 19) emit light. Accordingly, the lighting device 20 can emit light of a linear irradiation pattern along the X direction.

Moreover, the light-emitting portions may be controlled in a way that the light emission intensity changes in accordance with a sine wave.

Figure 20:
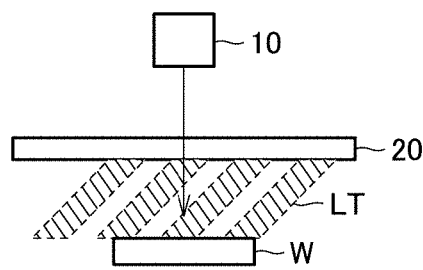
FIG. 20 is a diagram used to describe a variation of the pattern lighting when the phase shift method is performed on the diffusion reflection surface.
Figure 21:
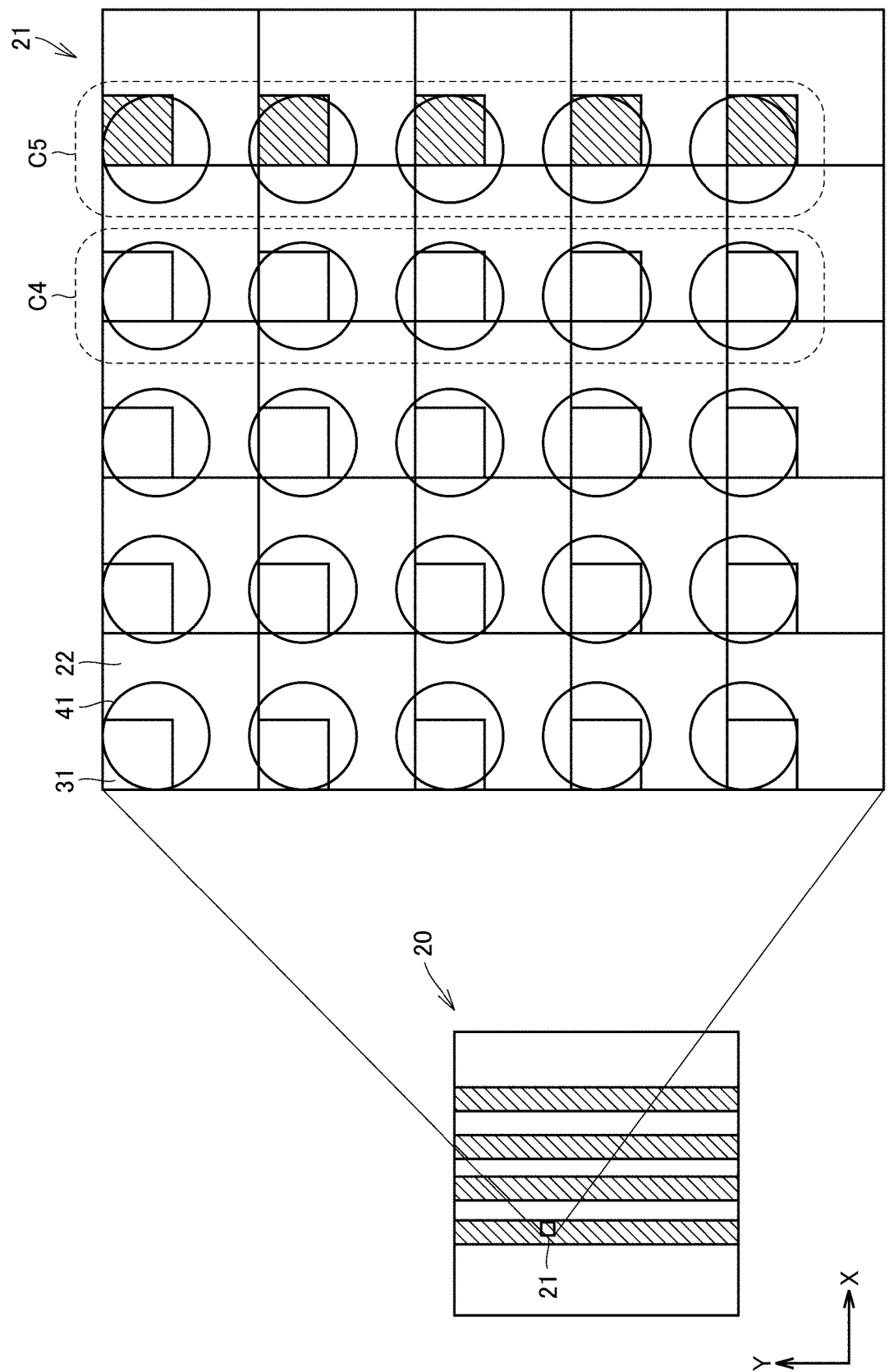
FIG. 21 is a diagram used to describe another example of the lighting pattern of the lighting device used for the phase shift method (diffusion reflection) shown in FIG. 20.

FIG. 20 is a diagram used to describe a variation of the pattern lighting when the phase shift method is performed on the diffusion reflection surface. FIG. 21 is a diagram used to describe another example of the lighting pattern of the lighting device used for the phase shift method (diffusion reflection) shown in FIG. 20. In the examples shown in FIG. 20 and FIG. 21, the light-emitting portions 31 disposed in a specific column (for example, a column C5) emit light. The column C5 is positioned on the outside (+X direction) of the column C4 shown in FIG. 17. Therefore, a light emission angle with respect to the optical axis of the photographing portion (the camera 10) increases. In other words, the light emission angle with respect to a light-emitting surface of the lighting device 20 is smaller than the irradiation pattern shown in FIG. 16 and FIG. 17.

Moreover, similar to the optical cutting method, in a case of phase shift (diffusion reflection), a plurality of emitting directions may also be combined. Because the dead angles in the photographing of the camera 10 can be reduced, the robustness of the inspection can be improved.

Figure 22:
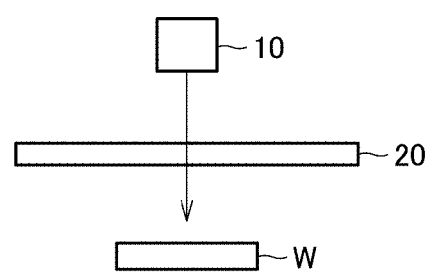
FIG. 22 is a diagram used to describe the pattern lighting when the phase shift method is performed on a workpiece surface where the light is regularly reflected.
Figure 23:
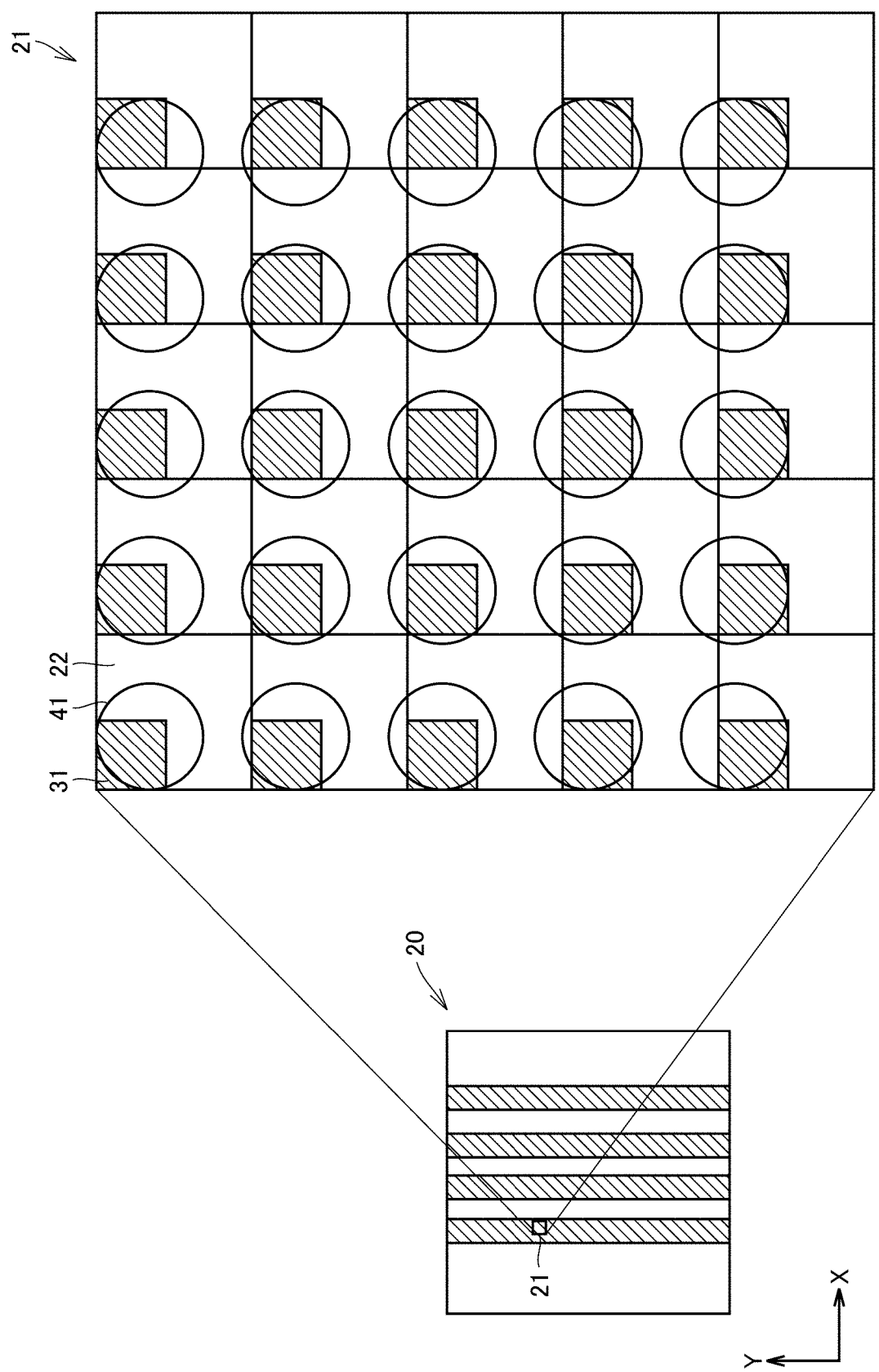
FIG. 23 is a diagram used to describe an example of the lighting pattern of the lighting device used for the phase shift method (regular reflection) shown in FIG. 22.

FIG. 22 is a diagram used to describe the pattern lighting when the phase shift method is performed on a workpiece surface where the light is regularly reflected. FIG. 23 is a diagram used to describe an example of the lighting pattern of the lighting device used for the phase shift method (regular reflection) shown in FIG. 22. For example, when the surface of the workpiece W is a mirror surface or a glass surface, the phase shift method using regular reflection is applied. As shown in FIG. 22 and FIG. 23, the lighting device 20 irradiates the light of the stripe-shaped irradiation pattern from a predetermined direction, and the camera 10 photographs the surface of the workpiece W. In the example shown in FIG. 23, in each lighting element 21, all the light-emitting portions 31 emit light. Accordingly, the light can be irradiated to the workpiece surface from a plurality of directions (may be regarded as all the directions).

Figure 24:
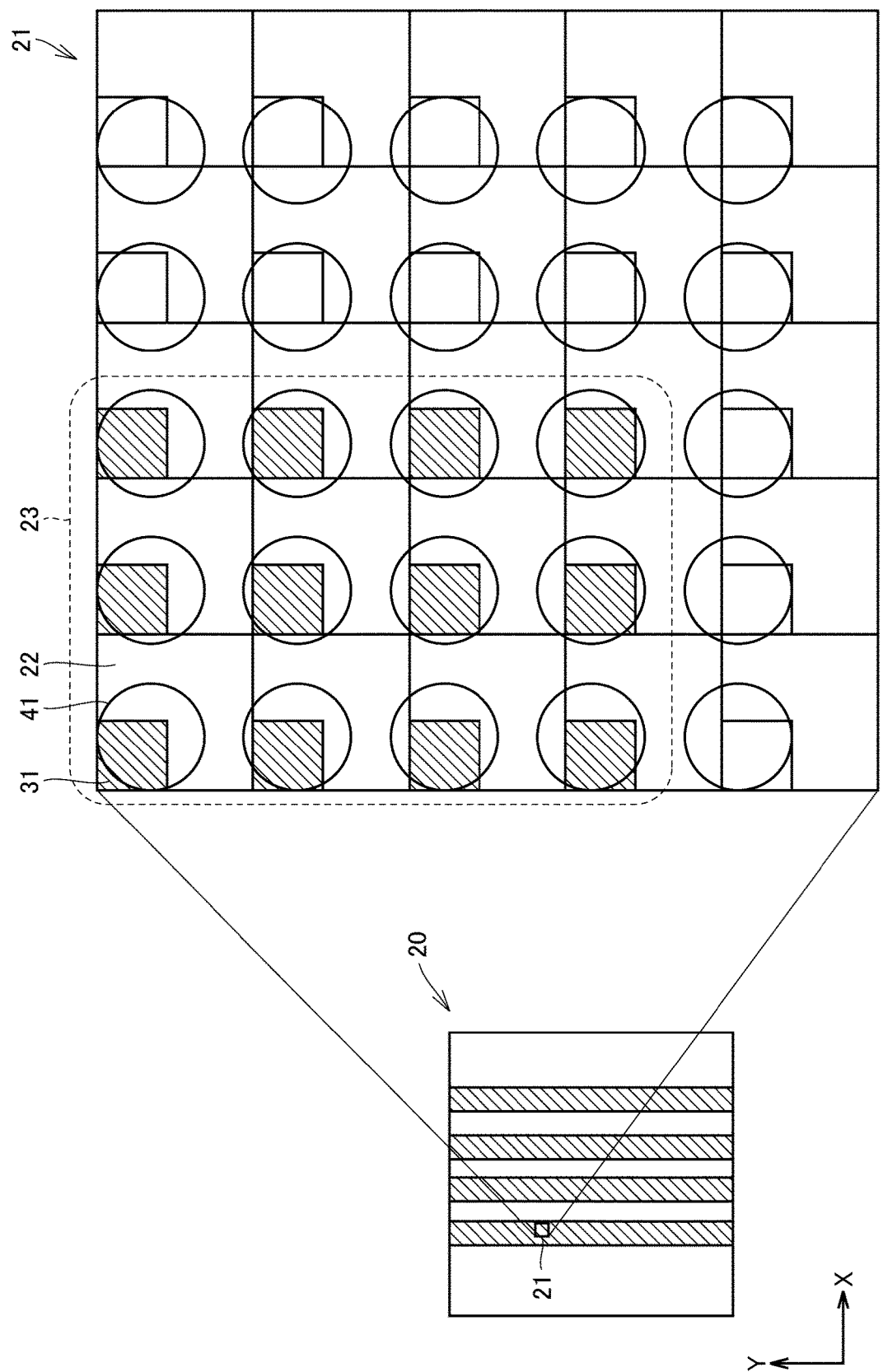
FIG. 24 is a diagram used to describe an example of the lighting pattern that restricts emitting directions of light or light-emitting regions.

In each lighting element 21, the emitting directions of light or light-emitting regions may be restricted. In this case, the light diffusion-reflected on the surface of the workpiece W can be reduced, and thus the S/N ratio can be improved in the photographing of the camera 10. FIG. 24 is a diagram used to describe an example of the lighting pattern that restricts emitting directions of light or light-emitting regions. As shown in FIG. 24, among 25 light-emitting portions, there may be only 12 (=4×3) light-emitting portions 31 belonging to a region 23 specified on the upper left on the paper surface that emit light.

Figure 25:
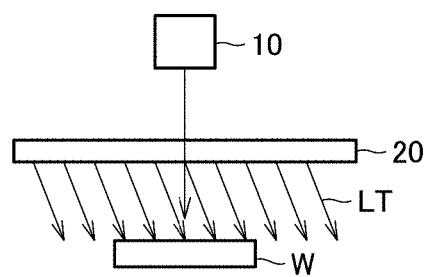
FIG. 25 is a diagram used to describe the pattern lighting when a photometric stereo method is performed.
Figure 26:
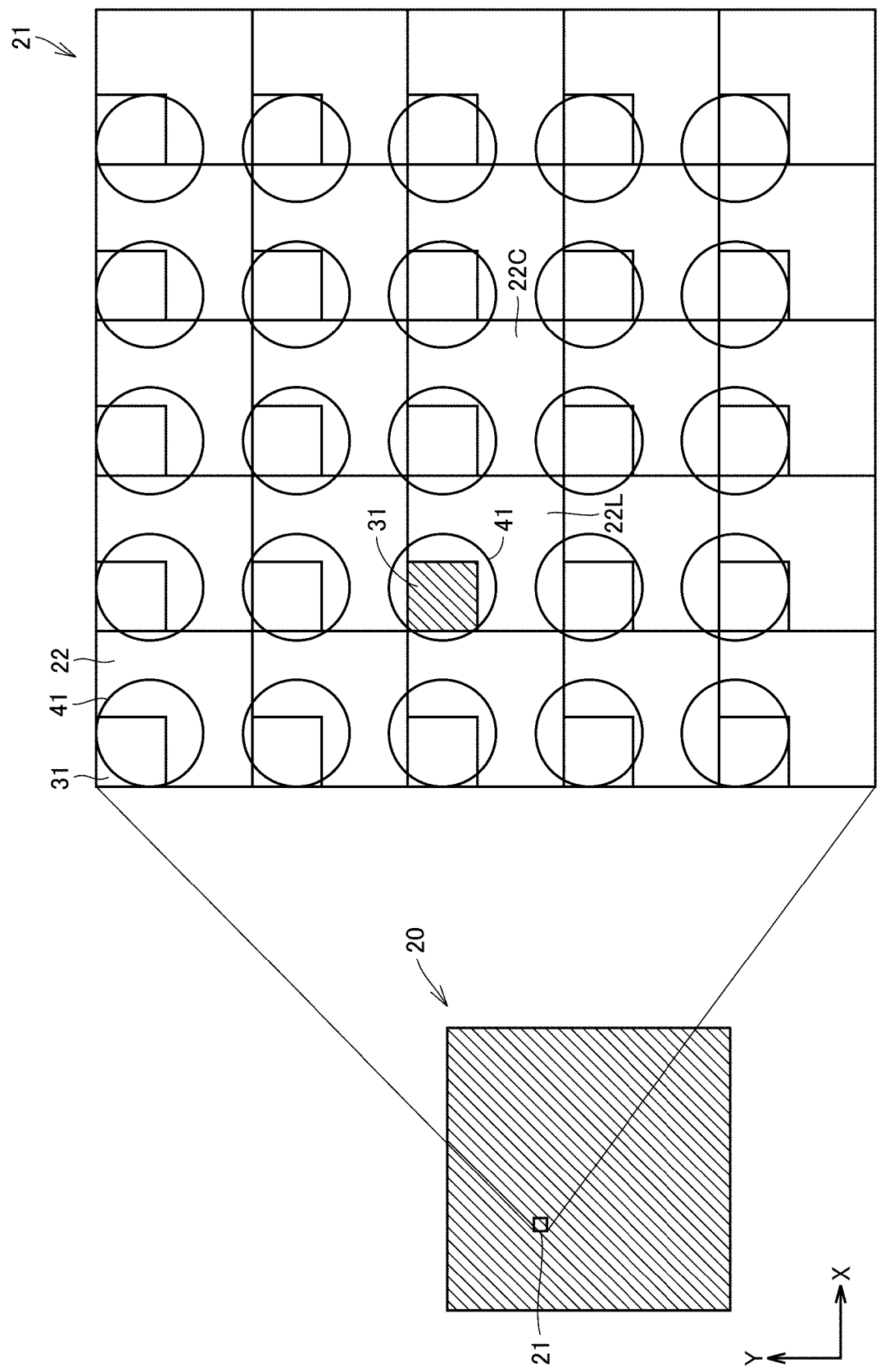
FIG. 26 is a diagram used to describe an example of the lighting pattern used for the light irradiation shown in FIG. 25.

FIG. 25 is a diagram used to describe the pattern lighting when a photometric stereo method is performed. In the photometric stereo method, a normal line in the surface of the workpiece W is estimated from a plurality of images photographed switching the lighting direction. For example, the lighting device 20 irradiates the light LT to the workpiece W from a left obliquely upward direction on the surface of the workpiece W. FIG. 26 is a diagram used to describe an example of the lighting pattern used for the light irradiation shown in FIG. 25. As shown in FIG. 26, all the lighting elements 21 of the lighting device 20 are made to emit light. In each lighting element 21, the light-emitting portions 31 of a cell 22L (an adjoining cell in the −X direction) to the immediate left of the central cell 22C emit light. The same is also true with the light-emitting cells in other lighting elements 21. Therefore, the light LT is irradiated to the surface of the workpiece W from the left obliquely upward direction.

Figure 27:
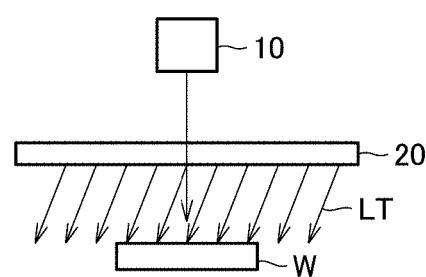
FIG. 27 is a diagram used to describe another pattern lighting when the photometric stereo method is performed.

FIG. 27 is a diagram used to describe another pattern lighting when the photometric stereo method is performed. As mentioned above, in the photometric stereo method, the lighting direction is switched to conduct photographing. In the example shown in FIG. 27, the lighting device 20 irradiates the light LT to the workpiece W from a right obliquely upward direction on the surface of the workpiece W.

Figure 28:
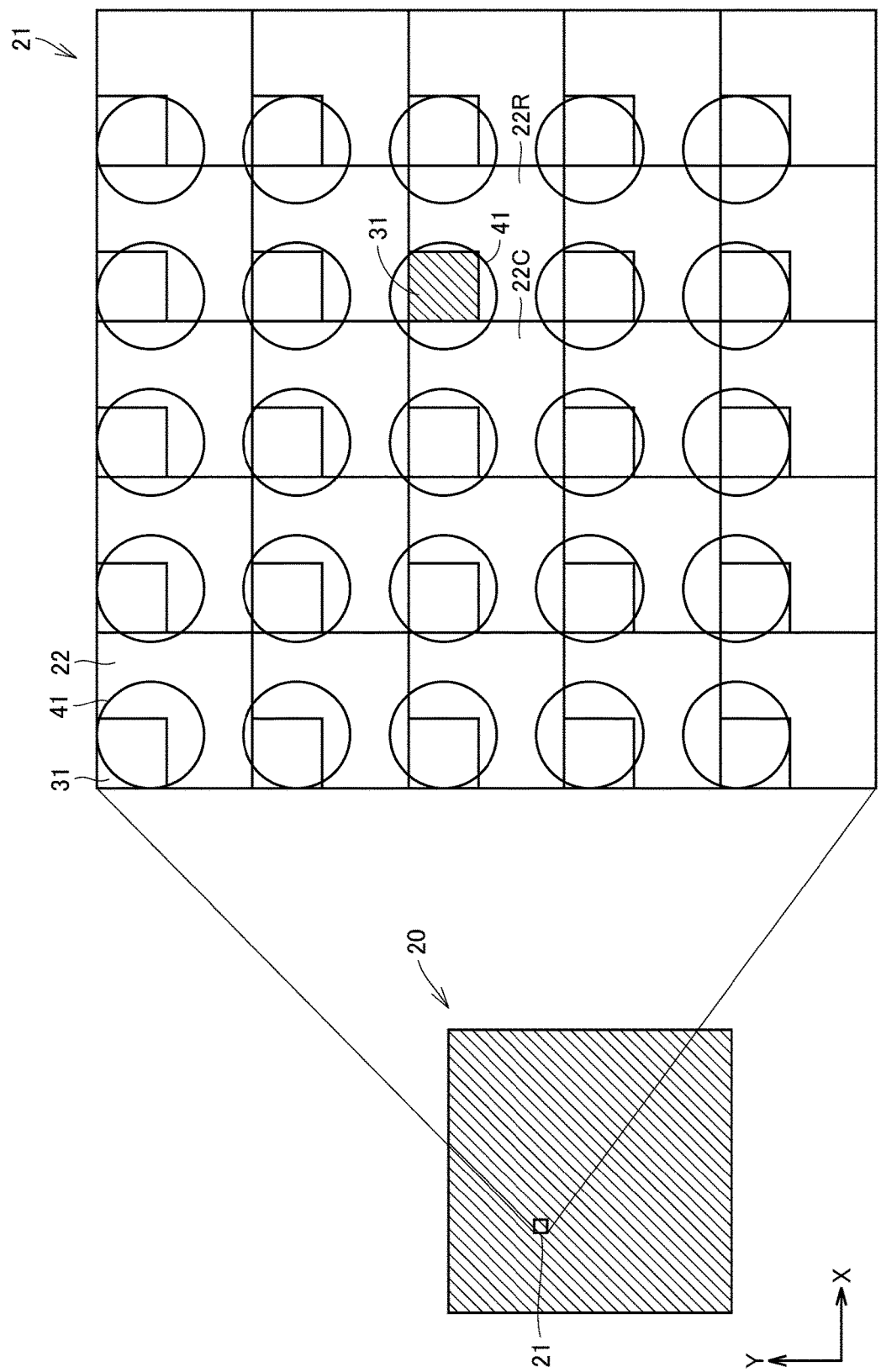
FIG. 28 is a diagram used to describe an example of the lighting pattern used for the light irradiation shown in FIG. 27.

FIG. 28 is a diagram used to describe an example of the lighting pattern used for the light irradiation shown in FIG. 27. As shown in FIG. 28, all the lighting elements 21 of the lighting device 20 are made to emit light. In each lighting element 21, the light-emitting portions 31 of a cell 22R (an adjoining cell in the +X direction) to the immediate right of the central cell 22C emit light. The same is also true with the light-emitting cells in other lighting elements 21. Therefore, the light LT is irradiated to the surface of the workpiece W from the right obliquely upward direction.

Moreover, the same is also true with a case that the workpiece W is irradiated from a direction rotated for 90° with respect to the light irradiation direction shown in FIG. 25 or FIG. 27. In each lighting element 21, the light-emitting portions 31 of a cell (an adjoining cell in the +Y direction) on an upper side of the central cell 22C emit light. Or the light-emitting portions 31 of a cell (an adjoining cell in the −Y direction) on a lower side of the central cell 22C emit light.

According to the aforementioned method, ideal parallel light can be irradiated to the workpiece W. Accordingly, the estimation accuracy of the normal line in the surface of the workpiece W can be increased. Therefore, the measurement accuracy of the surface shape of the workpiece W can be increased.

E. Variations of Configuration of Lighting Device

Figure 29:
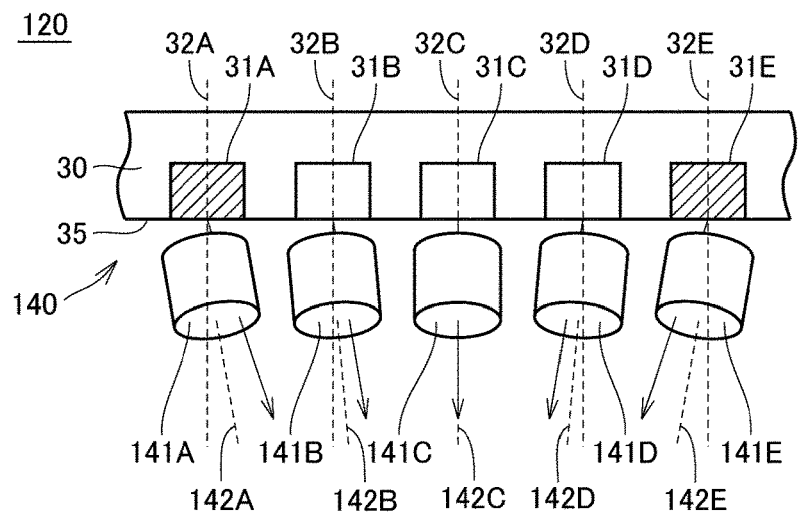
FIG. 29 is a schematic diagram showing a portion of a cross section of a lighting device of variation 1.

FIG. 29 is a schematic diagram showing a portion of a cross section of a lighting device 120 of variation 1. Compared with the lighting device 20 shown in FIG. 3, the lighting device 120 includes a micro lens array 140 instead of the micro lens array 40. The micro lens array 140 includes a plurality of lenses 141 that is a plurality of micro lenses disposed facing the plurality of light-emitting portions 31 respectively. In FIG. 29, lenses 141A-141E facing the light-emitting portions 31A-31E respectively are representatively shown.

Each of the lenses 141A-141E is a rod lens. Between the lenses 141A-141E, angles of the optical axes (optical axes 142A-142E) of the lenses to the optical axes (optical axes 32A-32E) of the light-emitting portions 31 are different. By varying incident angles of the light to the incident surfaces of the rod lenses, the emission angles (angles to the optical axes of the lenses) of the light emitted from the emission surface the rod lenses can be varied. Therefore, in the lighting device 120, the emitting direction of the light can be varied for each light-emitting portion. By using the rod lenses, the distance between the workpiece W and the lighting device 120 capable of performing shape inspection of the workpiece W can be increased.

Figure 30:
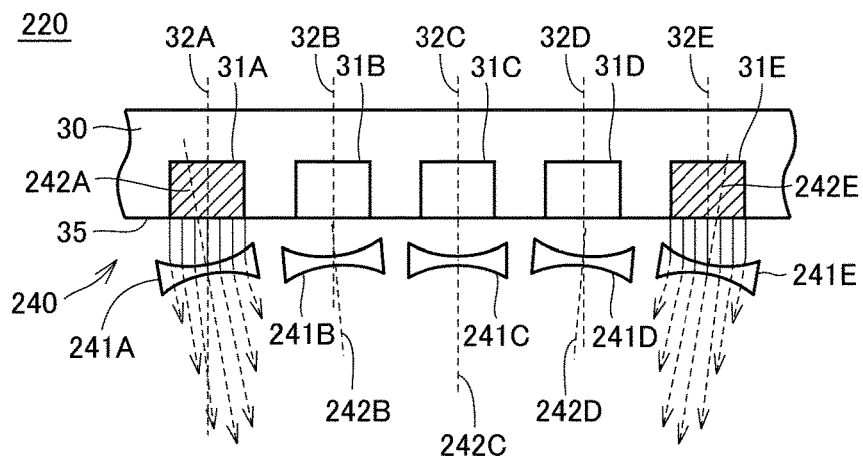
FIG. 30 is a schematic diagram showing a portion of a cross section of a lighting device of variation 2.

FIG. 30 is a schematic diagram showing a portion of a cross section of a lighting device 220 of variation 2. Compared with the lighting device 20 shown in FIG. 3, the lighting device 220 includes a micro lens array 240 instead of the micro lens array 40. The micro lens array 240 includes a plurality of lenses 241 which is a plurality of micro lenses disposed facing the plurality of light-emitting portions 31 respectively. In FIG. 30, lenses 241A-241E facing the light-emitting portions 31A-31E respectively are representatively shown.

Each of the lenses 241A-241E is a concave lens. Similar to the variation shown in FIG. 29, between the lenses 241A-241E, angles of the optical axes of the lenses to the optical axes of the light-emitting portions 31 are different. By varying the angles of the optical axes (the optical axes 242A-242E) of the lenses to the optical axes (the optical axis 32A-32E) of the light-emitting portions, the emission angles (angles to the optical axes of the lenses) of the light emitted from the concave lenses can be varied.

Figure 31:
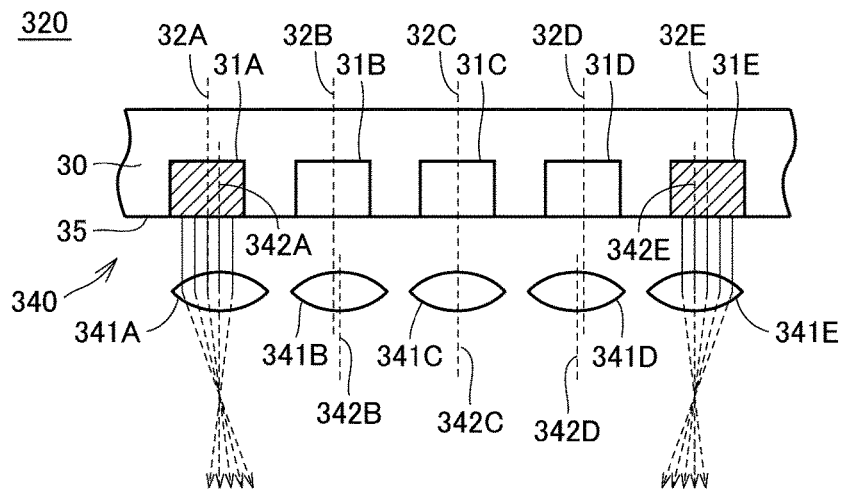
FIG. 31 is a schematic diagram showing a portion of a cross section of a lighting device of variation 3.

FIG. 31 is a schematic diagram showing a portion of a cross section of a lighting device 320 of variation 3. Compared with the lighting device 20 shown in FIG. 3, the lighting device 320 includes a micro lens array 340 instead of the micro lens array 40. The micro lens array 340 includes a plurality of lenses 341 which is a plurality of micro lenses disposed facing the plurality of light-emitting portions 31 respectively. In FIG. 31, lenses 341A-341E facing the light-emitting portions 31A-31E respectively are representatively shown.

In variation 3, the lenses 41A-41E in the configuration in FIG. 3 are replaced by the lenses 341A-341E, and the optical axes 42A-42E are replaced by optical axes 342A-342E. Each of the lenses 341A-341E is a convex lens. However, the shape of each of the lenses 341A-341E is different from the shapes of the lenses 41A-41E. The same as the example shown in FIG. 3, by varying relative positions of the optical axes (the optical axes 342A-342E) of the lenses to the optical axes (the optical axes 32A-32E) of the light-emitting portions, the irradiation directions of the light emitted from the light-emitting portions can be controlled by the lenses.

Moreover, in the lighting devices shown in FIG. 29 and FIG. 30, the lighting elements include a plurality of cells 22 disposed in a matrix form (see FIG. 5). Between the plurality of cells 22, the inclination angles of the optical axes of the lenses to the optical axes of the light-emitting portions can be varied in accordance with the position of the cells.

Furthermore, the angles of the optical axes of the lenses with respect to the X axis and the angles of the optical axes of the lenses with respect to the Y axis may be different in each cell.

Besides, in the micro lens arrays 140, 240, 340 shown in FIG. 29-FIG. 31, the light-shielding portion 44 (see FIG. 8-FIG. 11) may be disposed around the lenses.

Figure 32:
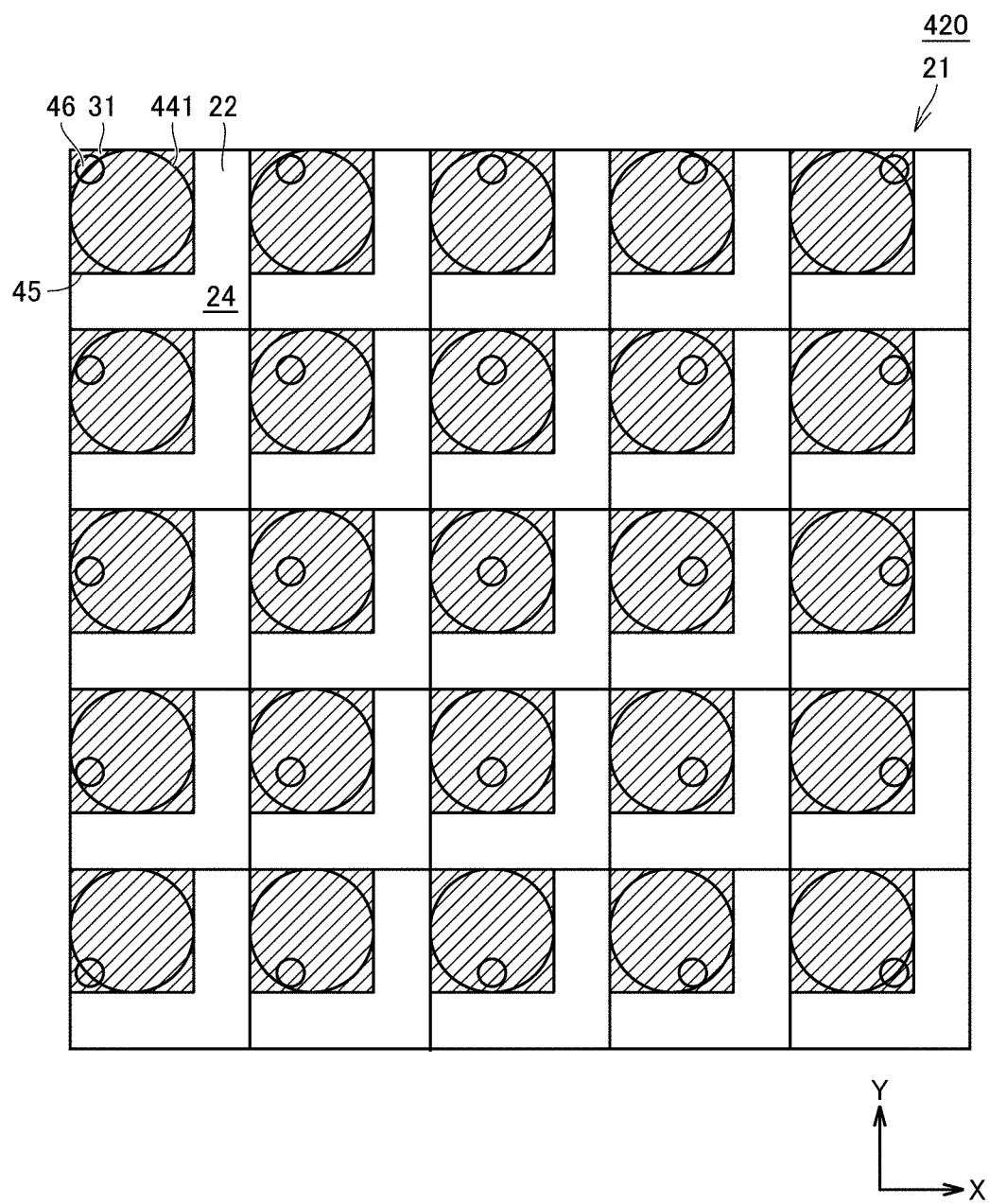
FIG. 32 is a plan view schematically showing an example of structures of a lighting element which is a constitutional element of a lighting device of variation 4.

FIG. 32 is a plan view schematically showing an example of structures of a lighting element which is a constitutional element of a lighting device of variation 4. As shown in FIG. 32, the plurality of light-emitting portions 31 and a plurality of lenses 441 (micro lenses) are disposed in the X direction and the Y direction at the same intervals. Therefore, the relation between the position of the optical axis of the light-emitting portion and the position of the optical axis of the lens is the same among the plurality of cells 22.

Figure 33:
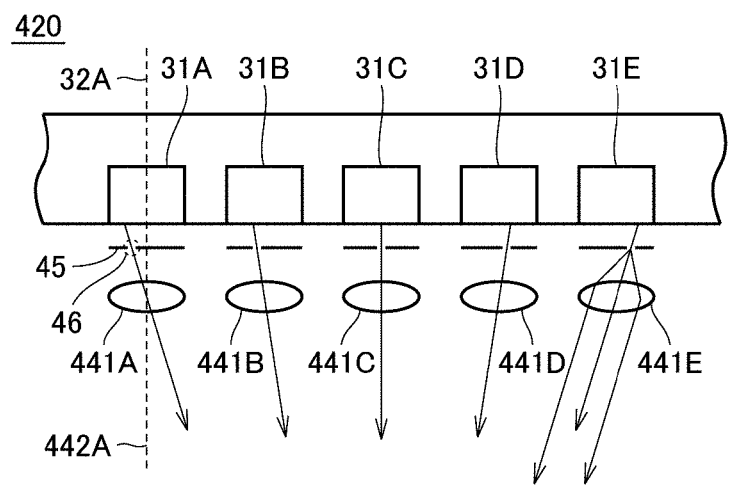
FIG. 33 is a schematic diagram showing a portion of a cross section of the lighting device of variation 4.

FIG. 33 is a schematic diagram showing a portion of a cross section of the lighting device of variation 4. In FIG. 33, the relation between the optical axis 32A of the light-emitting portion 31A and an optical axis 442A of the lens 441A is typically shown. In the example shown in FIG. 33, the optical axis of the light-emitting portion corresponds with the optical axis of the lens. However, variation 4 is not limited to the case in which the optical axes of the micro lenses correspond with the optical axes of the light-emitting portions. In variation 4, the relation between the position of the optical axis of the light-emitting portion and the position of the optical axis of the lens may be the same among the plurality of cells 22.

The lighting device 420 further includes a light-shielding portion 45. The light-shielding portion 45 is disposed between at least a portion of micro lenses among a plurality of lenses 441 and the light-emitting portions facing at least the portion of micro lenses. The light-shielding portion 45 consists of a member impenetrable to light or a member attenuating light. Pinholes 46 are made on the light-shielding portion 45. Therefore, the lights emitted from the light-emitting portions 31 are incident to the lenses 441 through the pinholes 46.

A plurality of pinholes 46 are disposed at pitches different from pitches of the plurality of lenses 441. Accordingly, relative positions of the pinholes 46 of the light-shielding portion 45 with respect to the optical axes of the lenses 441 are changed. Therefore, in at least a portion of lenses 441, the positions of the pinholes 46 of the light-shielding portion 45 with respect to the optical axes of the lenses 441 are deviated. However, not all pinholes 46 are necessarily deviated with respect to the optical axes of corresponding lenses 441.

According to variation 4, the same effect as the embodiments and variation 1-3 can be obtained. Proceeding directions of the lights passing through the pinholes 46 can be controlled by the micro lenses. Accordingly, incident directions of the lights passing through the pinholes 46 to the lenses can be varied for each cell. Therefore, the lighting elements 21 can irradiate lights to the workpiece from a plurality of directions. Furthermore, by selecting the cells to be lighted up among the plurality of cells, the irradiation directions of the lights from the lighting elements 21 can be controlled.

The light-shielding portion 45 can be implemented by a film for example. As another example, the light-shielding portion 45 may also be implemented by, for example, a piece of plate formed in a manner that light is transmitted or shielded only in required parts.

Types of the lenses 441 are not particularly limited. Therefore, the lenses 41 may be applied to the lighting device 420, or the micro lenses shown in each of FIG. 29 to FIG. 31 may be applied to the lighting device 420.

Figure 34:
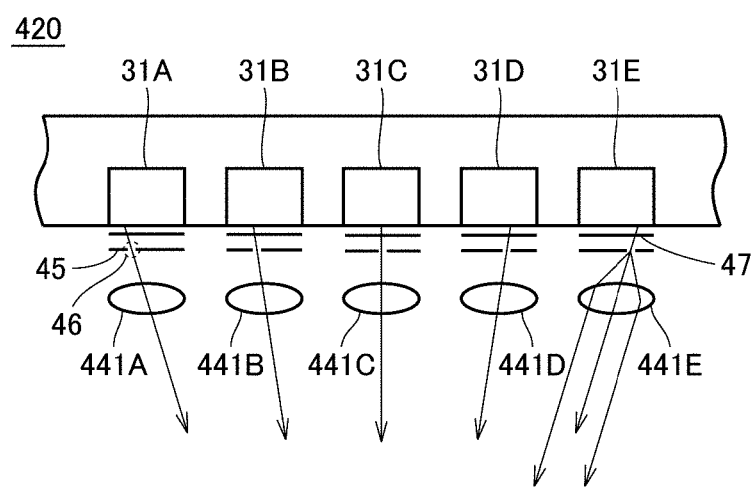
FIG. 34 is a schematic diagram showing a portion of a cross section of a configuration added to the lighting device of variation 4.

The configuration of the lighting device 420 is not limited as shown in FIG. 32 and FIG. 33. As shown in FIG. 34, the lighting device 420 can further include a light diffusion portion 47 that is disposed between the light-emitting portions 31 (31A-31E) and the light-shielding portion 45. The light diffusion portion 47 diffuses the lights from the light-emitting portions in order to obtain uniform luminance of the light-emitting portions. It is required that the lights are transmitted without being diffused in gaps between the light-emitting portions. Therefore, the light diffusion portion 47 is disposed only in front of the light-emitting portions. Accordingly, the camera 10 can photographs the workpiece W.

F. APPENDIX

As mentioned above, this embodiment includes the following disclosure.

(Configuration 1)
An image inspection device which is an image inspection device (1) that uses photographic images to inspect a target (W), including:
a photographing portion (10) that photographs the target (W); and
a light transmissible lighting portion (20, 120, 220, 320) that is disposed between the target (W) and the photographing portion (10) and configured to irradiate light in a direction toward the target (W); wherein
the lighting portion (20, 120, 220, 320) includes
a plurality of light-emitting portions (31, 31A-31E) that is arranged in a matrix form and configured to be capable of selectively emitting light, and
an optical system (40, 140, 240, 340) configured to control irradiation directions of the light emitted from each of the plurality of light-emitting portions (31, 31A-31E) to be directions corresponding to positions of each of the plurality of light-emitting portions (31, 31A-31E).

(Configuration 2)
The image inspection device (1) recited in configuration 1, wherein the optical system (40, 140, 240, 340) includes
a plurality of micro lenses (41, 41A-41E, 141A-141E, 241A-241E, 341A-341E) disposed facing the plurality of light-emitting portions (31, 31A-31E) respetively.

(Configuration 3)
The image inspection device (1) recited in configuration 2, wherein the plurality of micro lenses (41, 41A-41E, 341A-341E) are disposed in a manner that optical axes (42, 42A-42E, 342A-342E) of at least a portion of micro lenses among the plurality of micro lenses (41, 41A-41E, 341A-341E) deviate from optical axes (32, 32A-32E) of the light-emitting portions (31, 31A-31E) facing at least the portion of the micro lenses.

(Configuration 4)
The image inspection device (1) recited in configuration 3, wherein the lighting portion (20, 120, 220, 320) is divided into a plurality of lighting elements (21), and
in at least one lighting element among the plurality of lighting elements (21), at least the portion of the micro lenses (41, 41A-41E, 341A-341E) is disposed with pitches (P2) smaller than pitches (P1) of the light-emitting portions (31, 31A-31E).

(Configuration 5)
The image inspection device (1) recited in configuration 4, wherein at least the portion of the micro lenses (41, 41A-41E, 341A-341E) is disposed disturbing regularity.

(Configuration 6)
The image inspection device (1) recited in configuration 2, wherein the plurality of micro lenses (141A-141E, 241A-241E) is disposed in a manner that optical axes (142A-142E, 242A-242E) of at least a portion of micro lenses among the plurality of micro lenses (141A-141E, 241A-241E) are inclined with respect to optical axes of the light-emitting portions (32, 32A-32E) facing at least the portion of micro lenses.

(Configuration 7)
The image inspection device (1) recited in any one of configuration 2 to configuration 6, wherein the lighting portion (20, 120, 220, 320) further includes
a light-shielding portion (44) configured to shield the light that is among the light emitted from the plurality of light-emitting portions (31, 31A-31E) and leaks from the surrounding of each of the plurality of micro lenses (41, 41A-41E, 141A-141E, 241A-241E, 341A-341E).

(Configuration 8)
The image inspection device (1) recited in configuration 2, wherein the lighting portion further includes
a light-shielding portion (45) that is disposed between at least a portion of micro lenses among the plurality of micro lenses and the light-emitting portions facing at least the portion of micro lenses, and
the light-shielding portion (45) has pinholes (46) that are formed on locations which are deviated with respect to the optical axes of at least the portion of micro lenses.

(Configuration 9)
The image inspection device (1) recited in configuration 8, wherein the lighting portion further includes
a light diffusion portion (47) that diffuses the lights from the plurality of light-emitting portions.

(Configuration 10)
A lighting device (20, 120, 220, 320) including the lighting portion recited in any one of configuration 1 to configuration 9.

Each embodiment disclosed here is considered illustrative in all aspects rather than limitative. The scope of the disclosure is shown by the scope of the claims rather than by the above description and the meaning equivalent to the scope of the claims and all modifications inside the scope are intended to be included in the scope of the disclosure. In addition, the disclosure described in the embodiment and each variation is intended to be performed independently or in a combined way whenever possible.

What is claimed is:

1. An image inspection device which uses photographic images to inspect a target, comprising:
    a photographing portion that photographs the target; and
    a light transmissible lighting portion that is disposed between the target and the photographing portion and configured to irradiate light in a direction toward the target, wherein an optical axis of the photographing portion directly passes through a light emission surface of the lighting portion;
    the lighting portion comprising:
    a plurality of light-emitting portions that is arranged in a matrix form and configured to be capable of selectively emitting light; and
    an optical system configured to control irradiation directions of the light emitted from each of the plurality of light-emitting portions to be directions corresponding to positions of each of the plurality of light-emitting portions,
    wherein the optical system is a micro lens array comprising a plurality of concave lenses arranged facing the plurality of light-emitting portions respectively, and each of the plurality of concave lenses is disposed to be respectively corresponding to one of the plurality of light-emitting portions,
    wherein angles of optical axes of each of the plurality of concave lenses to optical axes of respective one of the plurality of light-emitting portions are different from each other,
    wherein the optical axes of at least a portion of the concave lenses among the plurality of the concave lenses disposed away from a center of the lighting portion are inclined toward an optical axis of a concave lens disposed corresponding to the center of the light portion, and the optical axis of the concave lens disposed corresponding to the center of the light portion is aligned with an optical axis of a light-emitting portion disposed at the center of the light portion.

2. The image inspection device according to claim 1, wherein
    the plurality of concave lenses are disposed in a manner that optical axes of at least a portion of the concave lenses among the plurality of concave lenses deviate from optical axes of the light-emitting portions facing at least the portion of the concave lenses.

3. The image inspection device according to claim 2, wherein
    the lighting portion is divided into a plurality of lighting elements, and
    in at least one lighting element among the plurality of lighting elements, at least the portion of the concave lenses is disposed with pitches smaller than pitches of the light-emitting portions.

4. The image inspection device according to claim 3, wherein
    at least the portion of the concave lenses is disposed disturbing regularity.

5. The image inspection device according to claim 1, wherein the plurality of concave lenses are disposed in a manner that optical axes of at least a portion of concave lenses among the plurality of concave lenses are inclined with respect to optical axes of the light-emitting portions facing at least the portion of concave lenses.

6. The image inspection device according to claim 1, wherein
    the lighting portion further includes a light-shielding portion configured to shield the light that is among the light emitted from the plurality of light-emitting portions and leaks from the surrounding of each of the plurality of concave lenses.

7. The image inspection device according to claim 1, wherein
    the lighting portion further includes
    a light-shielding portion that is disposed between at least a portion of concave lenses among the plurality of concave lenses and the light-emitting portions facing at least the portion of concave lenses, and
    the light-shielding portion has pinholes that are formed on locations which are deviated with respect to the optical axes of at least the portion of concave lenses.

8. The image inspection device according to claim 7, wherein
    the lighting portion further includes a light diffusion portion that diffuses the lights from the plurality of light-emitting portions.

9. A lighting device comprising the lighting portion according to claim 1.

10. The image inspection device according to claim 2, wherein
the lighting portion further includes a light-shielding portion configured to shield the light that is among the light emitted from the plurality of light-emitting portions and leaks from the surrounding of each of the plurality of concave lenses.

11. The image inspection device according to claim 3, wherein
the lighting portion further includes a light-shielding portion configured to shield the light that is among the light emitted from the plurality of light-emitting portions and leaks from the surrounding of each of the plurality of concave lenses.

12. The image inspection device according to claim 4, wherein
the lighting portion further includes a light-shielding portion configured to shield the light that is among the light emitted from the plurality of light-emitting portions and leaks from the surrounding of each of the plurality of concave lenses.

13. The image inspection device according to claim 5, wherein
the lighting portion further includes a light-shielding portion configured to shield the light that is among the light emitted from the plurality of light-emitting portions and leaks from the surrounding of each of the plurality of concave lenses.

14. A lighting device comprising the lighting portion according to claim 2.

15. A lighting device comprising the lighting portion according to claim 3.

16. A lighting device comprising the lighting portion according to claim 4.

17. A lighting device comprising the lighting portion according to claim 5.

18. A lighting device comprising the lighting portion according to claim 6.

* * * * *